J. H. TAUSCH.
FENCE MACHINE.
APPLICATION FILED JAN. 24, 1916. RENEWED JAN. 28, 1920.
1,351,810.
Patented Sept. 7, 1920.
19 SHEETS—SHEET 5.
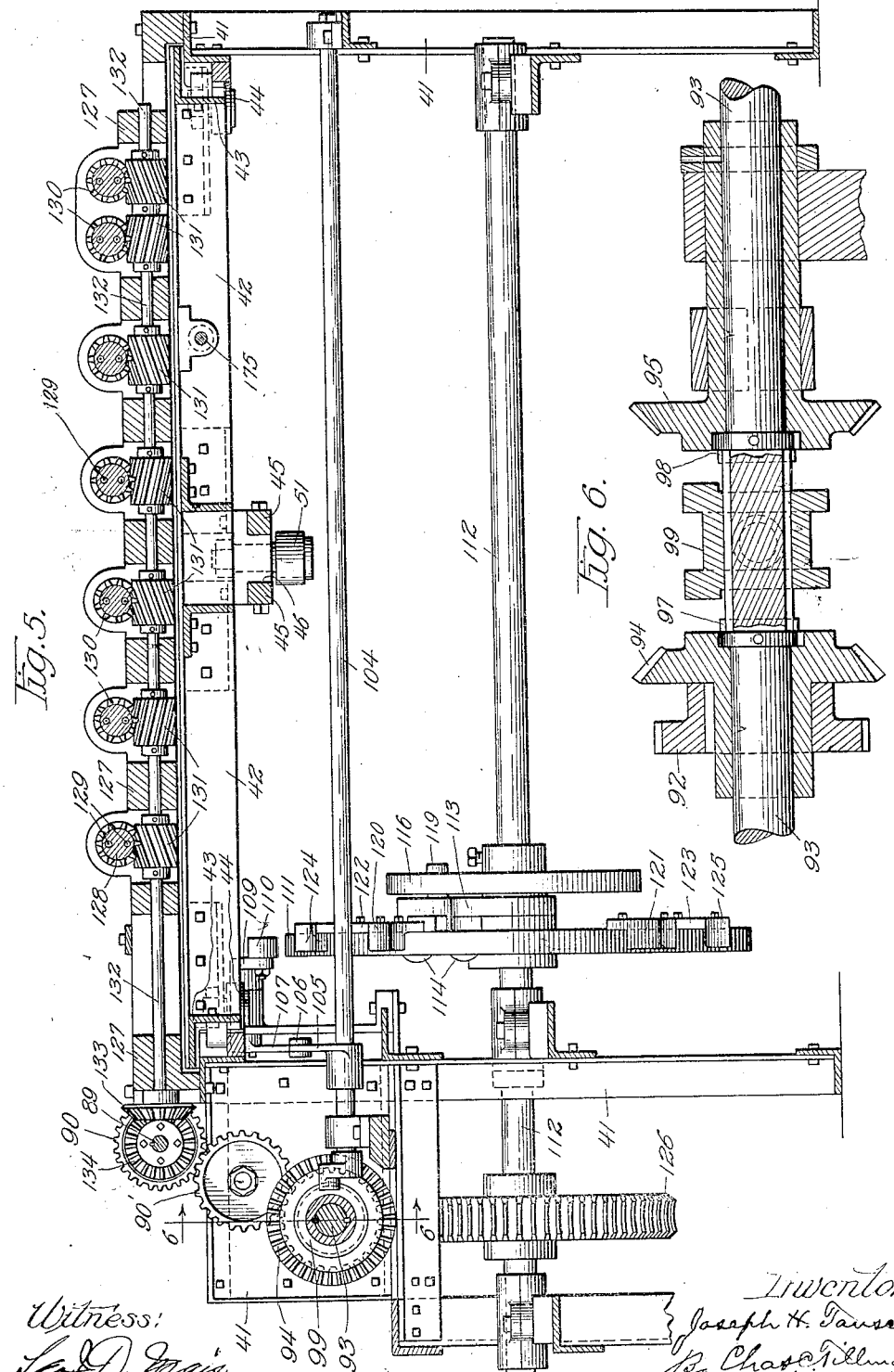

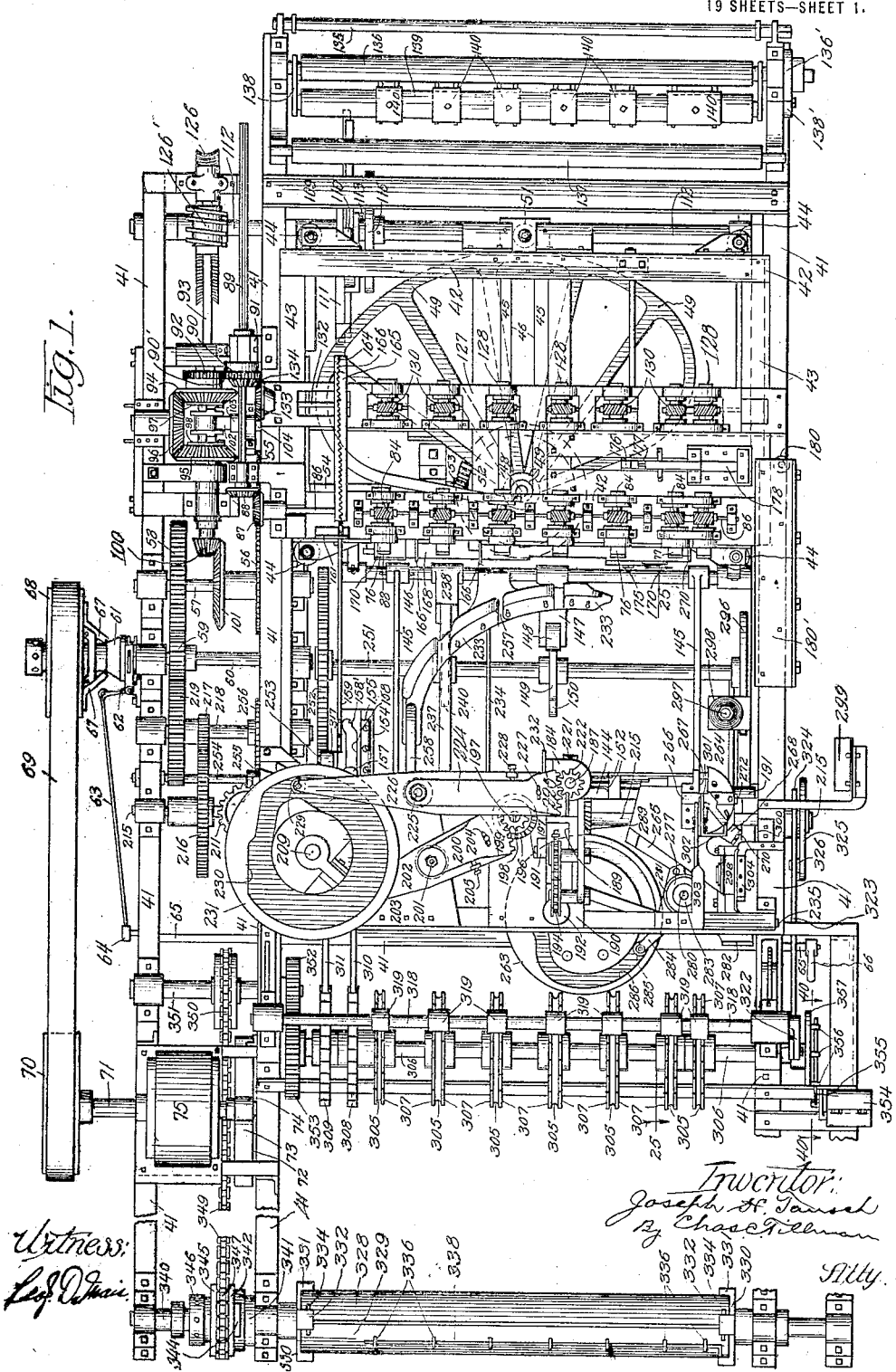

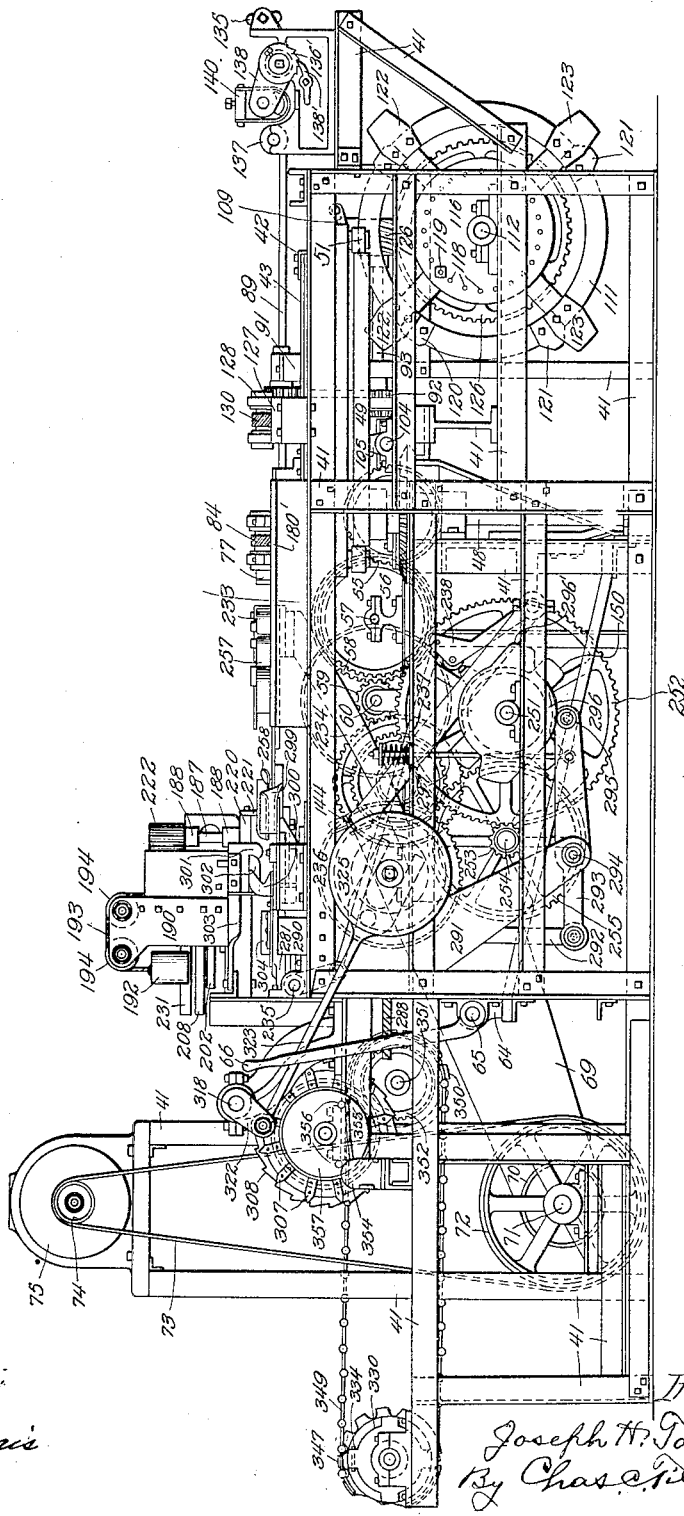

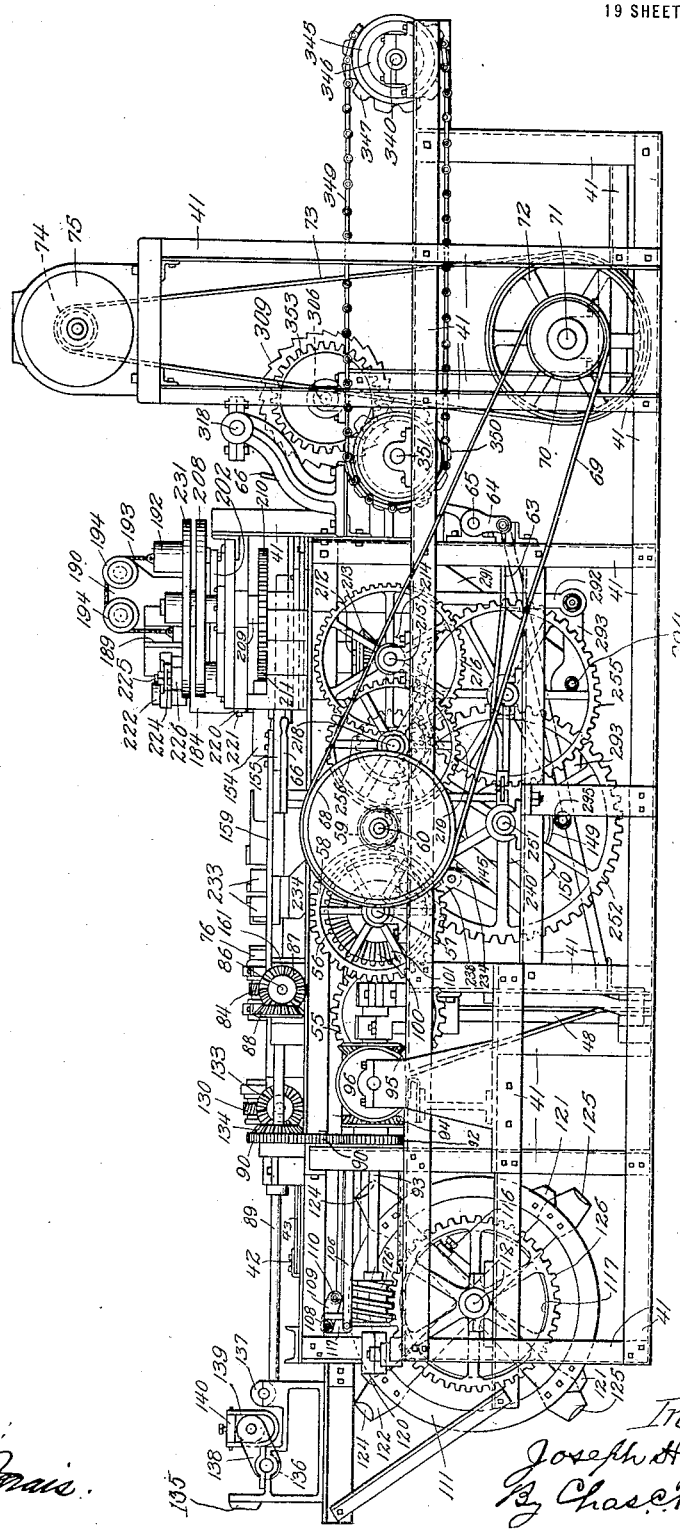

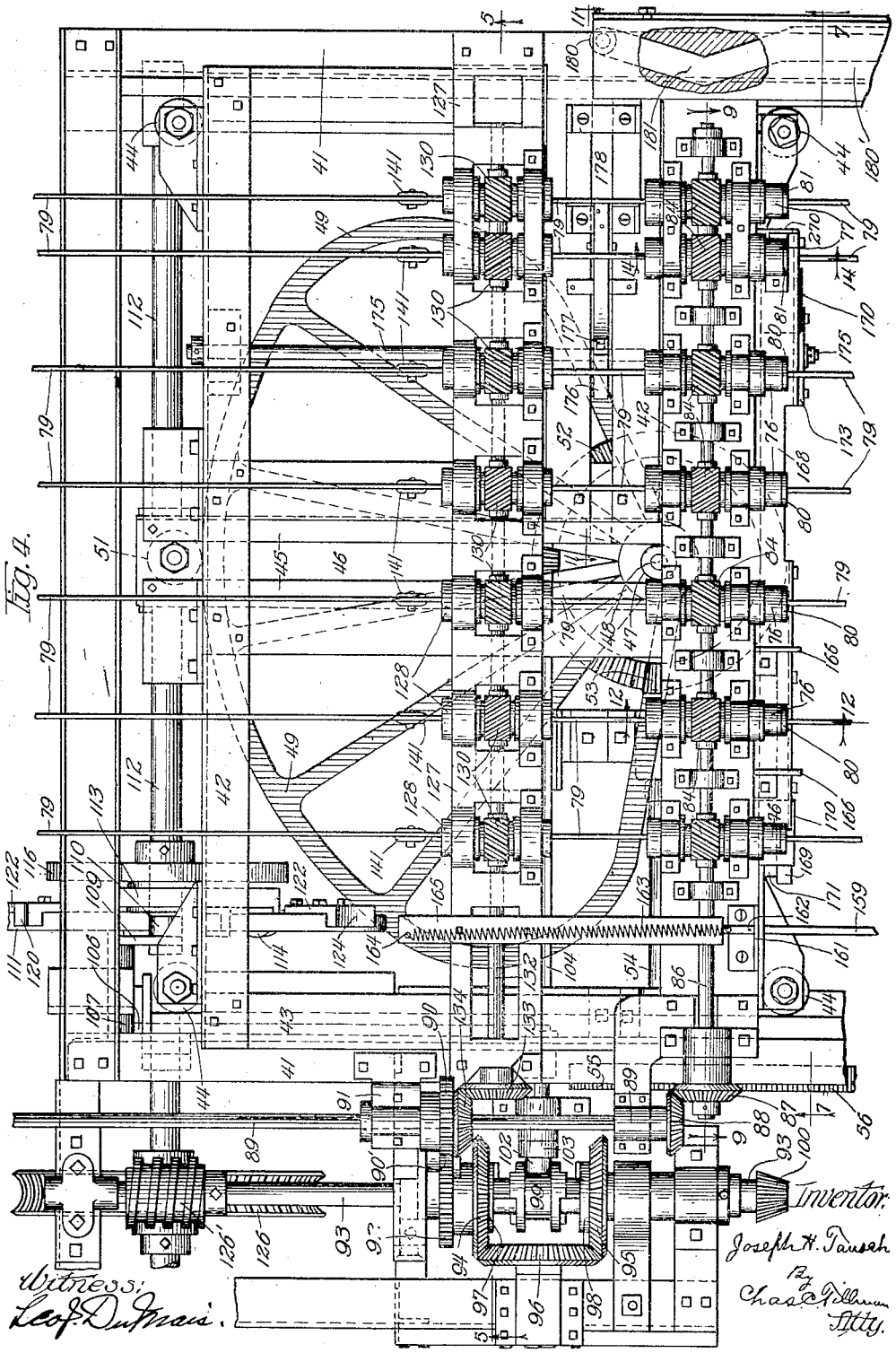

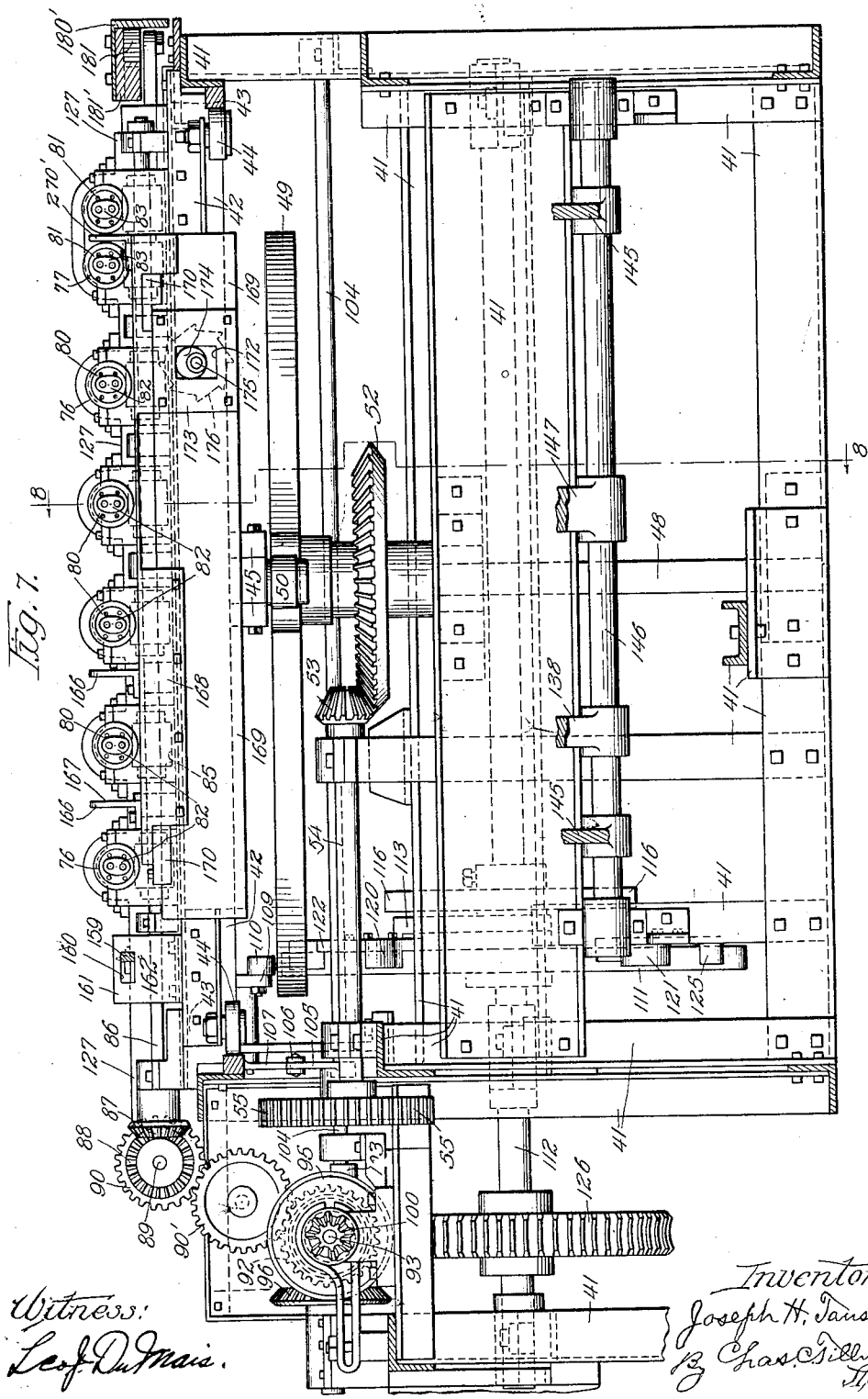

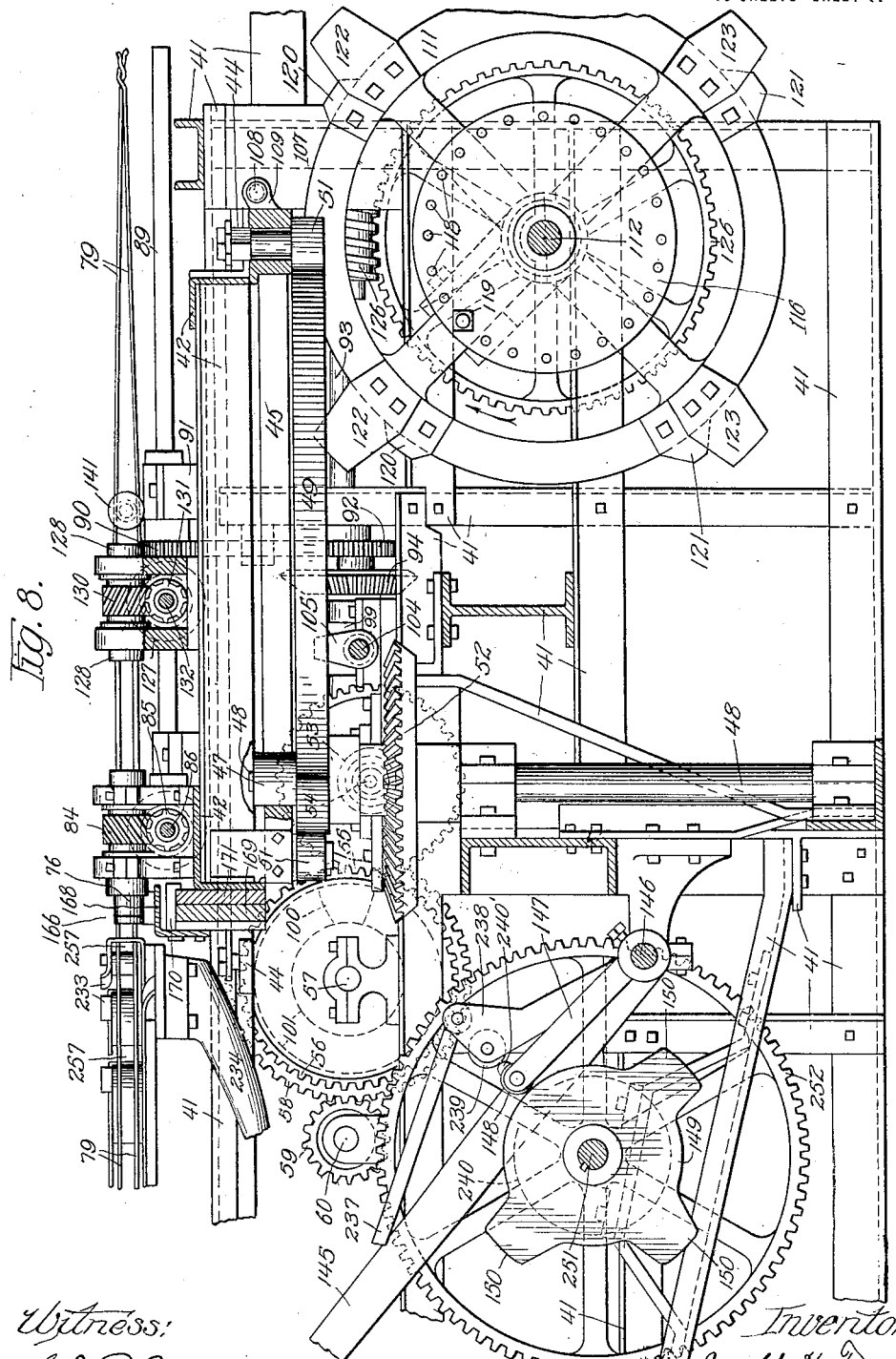

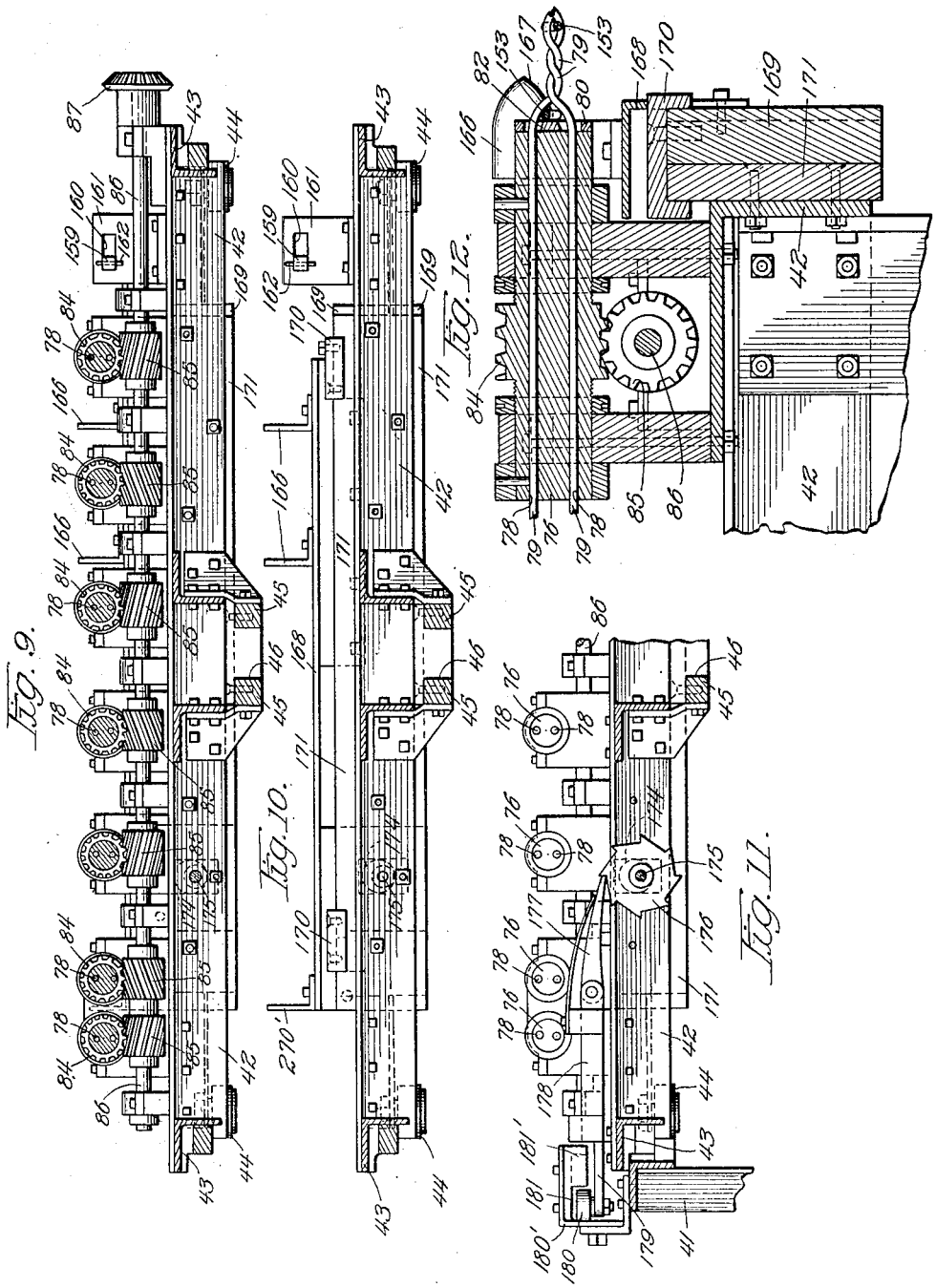

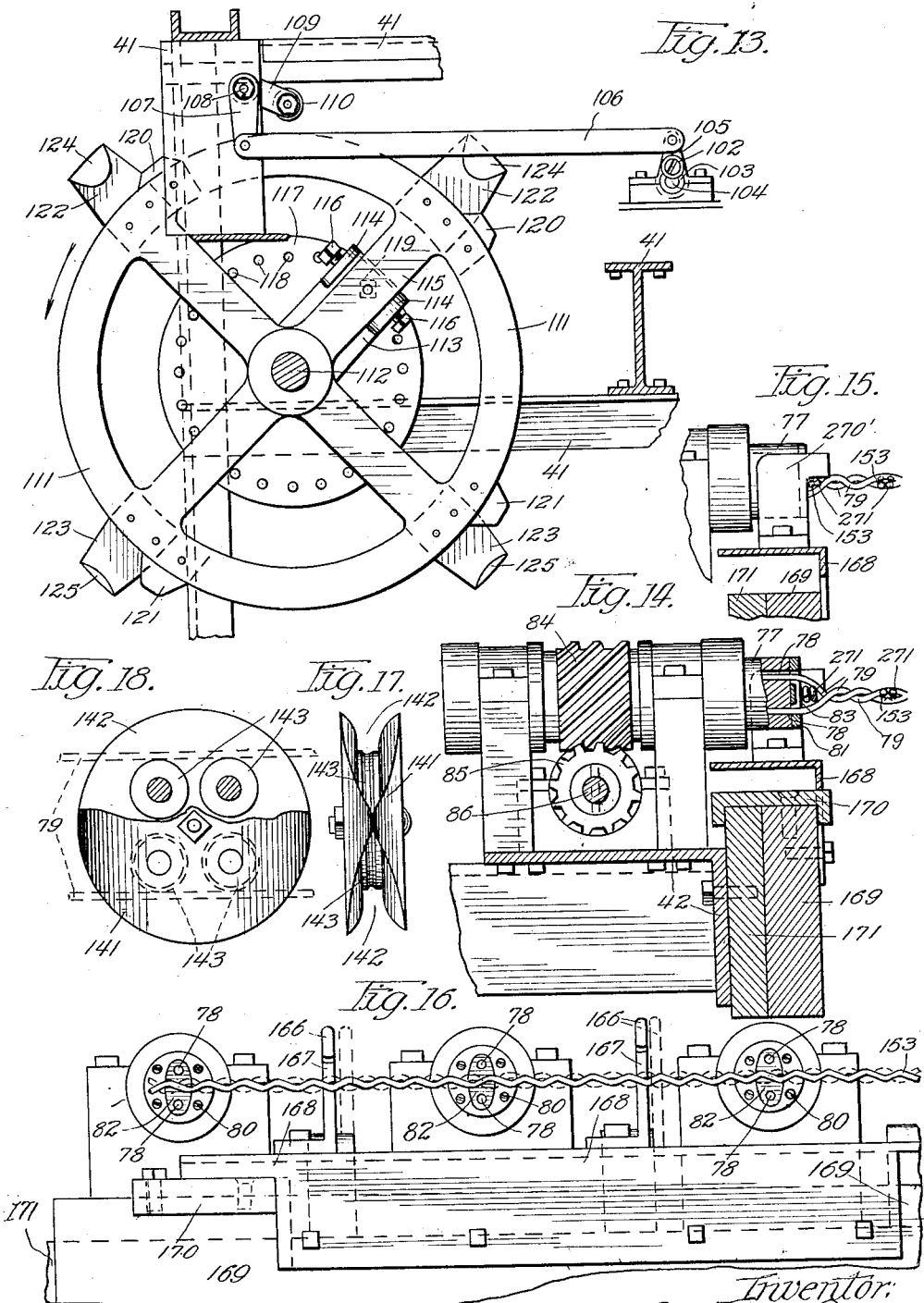

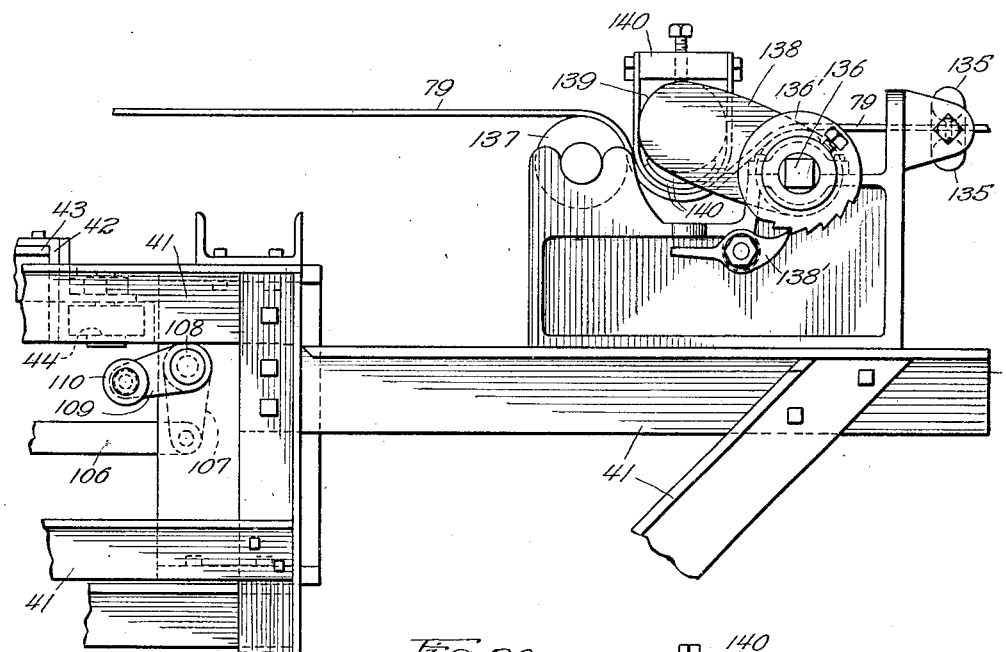
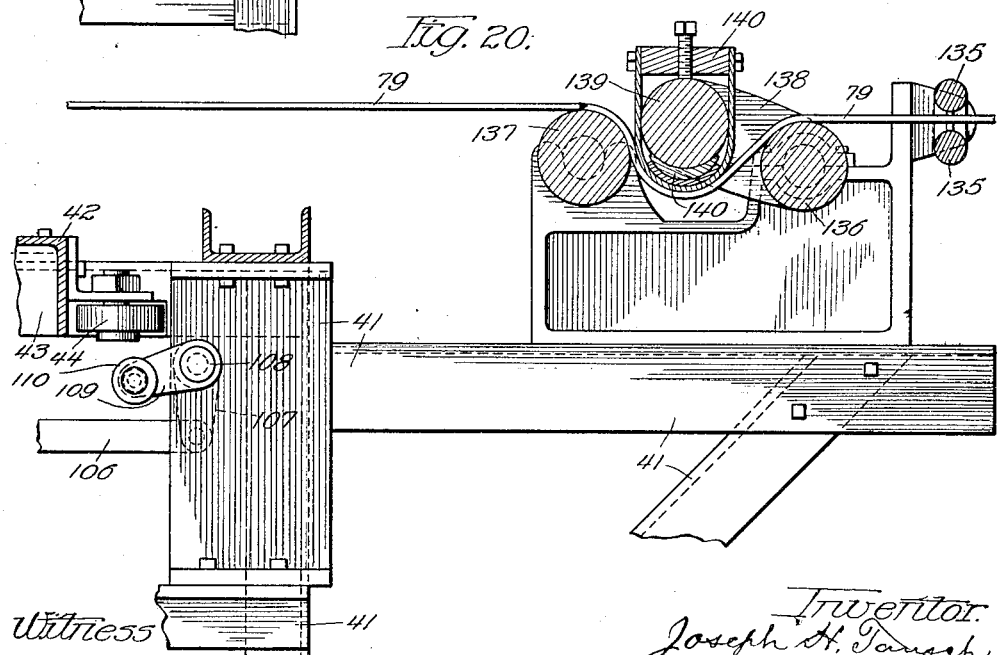

J. H. TAUSCH.
FENCE MACHINE.
APPLICATION FILED JAN. 24, 1916. RENEWED JAN. 28, 1920.

1,351,810.

Patented Sept. 7, 1920.
19 SHEETS—SHEET 11.

Inventor:
Joseph H. Tausch
By Chas. C. Tillman
Atty.

Witness:
Leo J. DuMais.

J. H. TAUSCH.
FENCE MACHINE.
APPLICATION FILED JAN. 24, 1916. RENEWED JAN. 28, 1920.

1,351,810.

Patented Sept. 7, 1920.
19 SHEETS—SHEET 14.

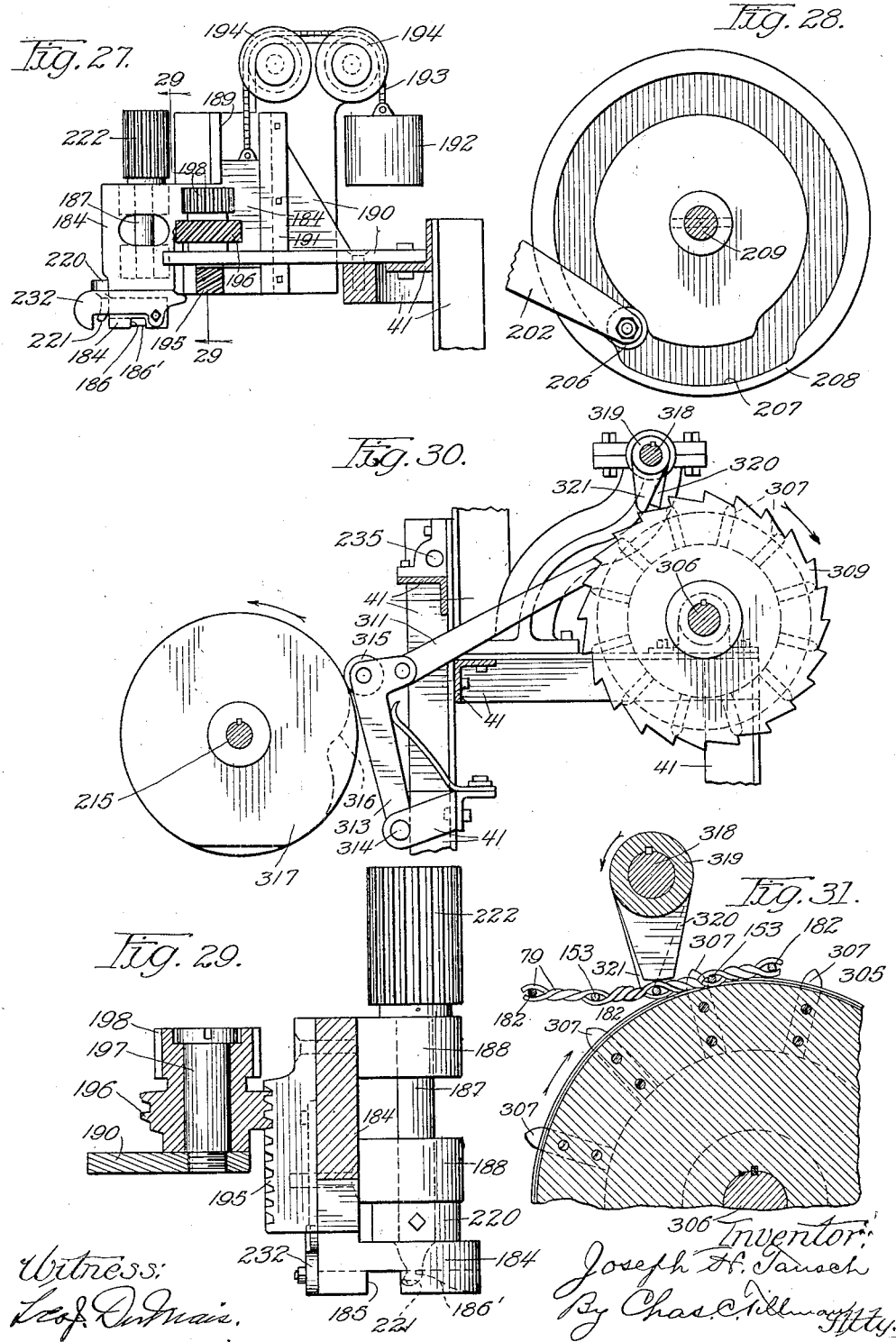

J. H. TAUSCH.
FENCE MACHINE.
APPLICATION FILED JAN. 24, 1916. RENEWED JAN. 28, 1920.
1,351,810. Patented Sept. 7, 1920.
19 SHEETS—SHEET 18.
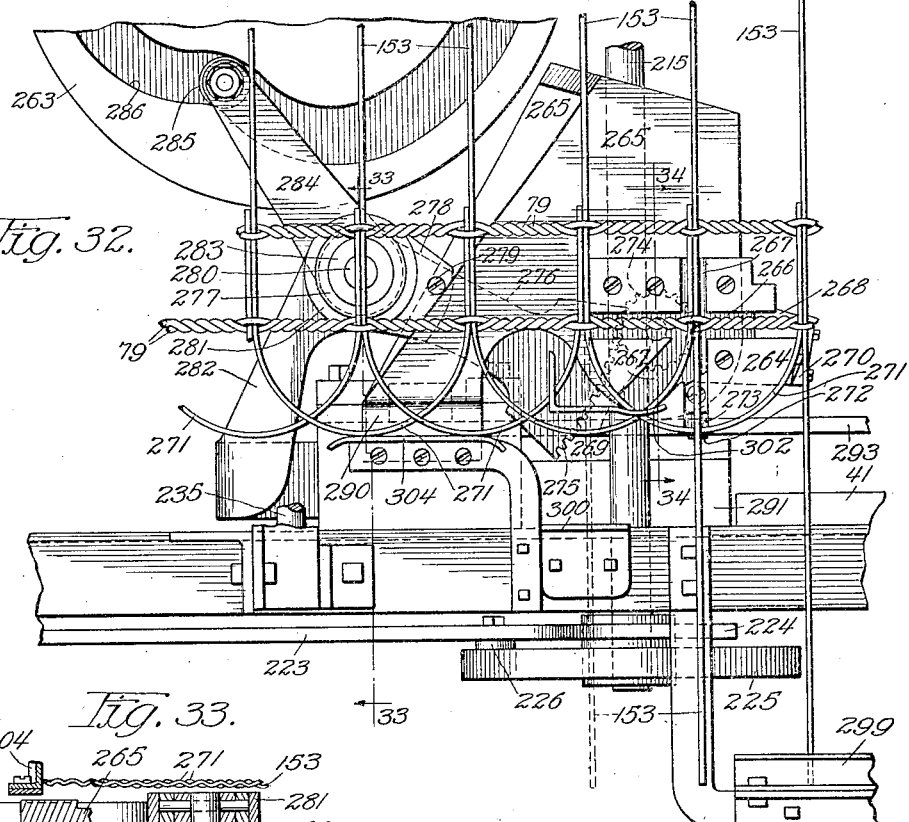
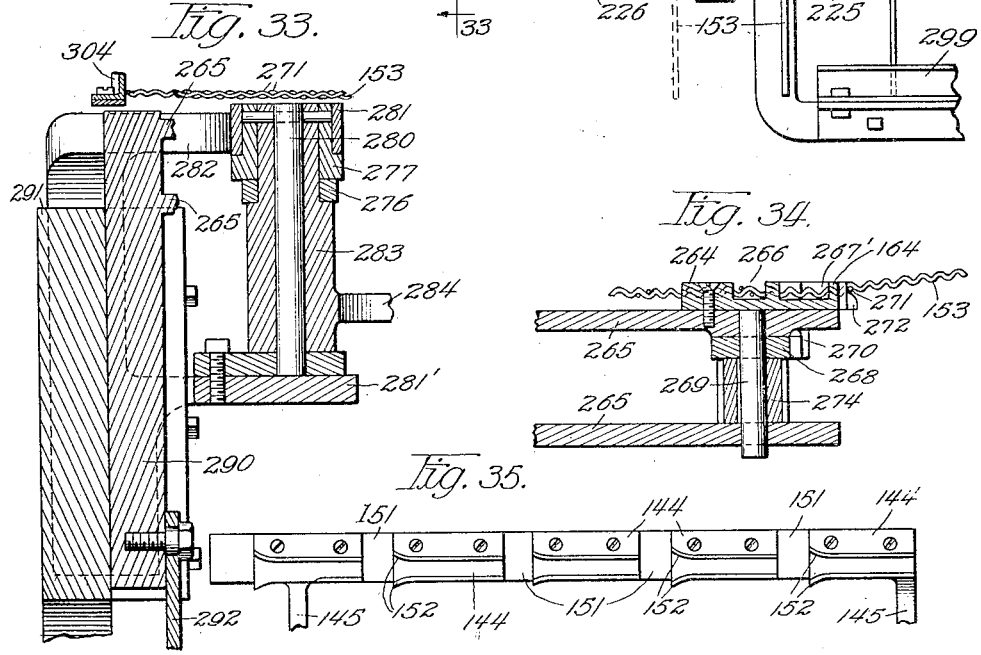
Witness:
Leo J. Dumais.
Inventor:
Joseph H. Tausch
By Chas. C. Gillmour Atty.

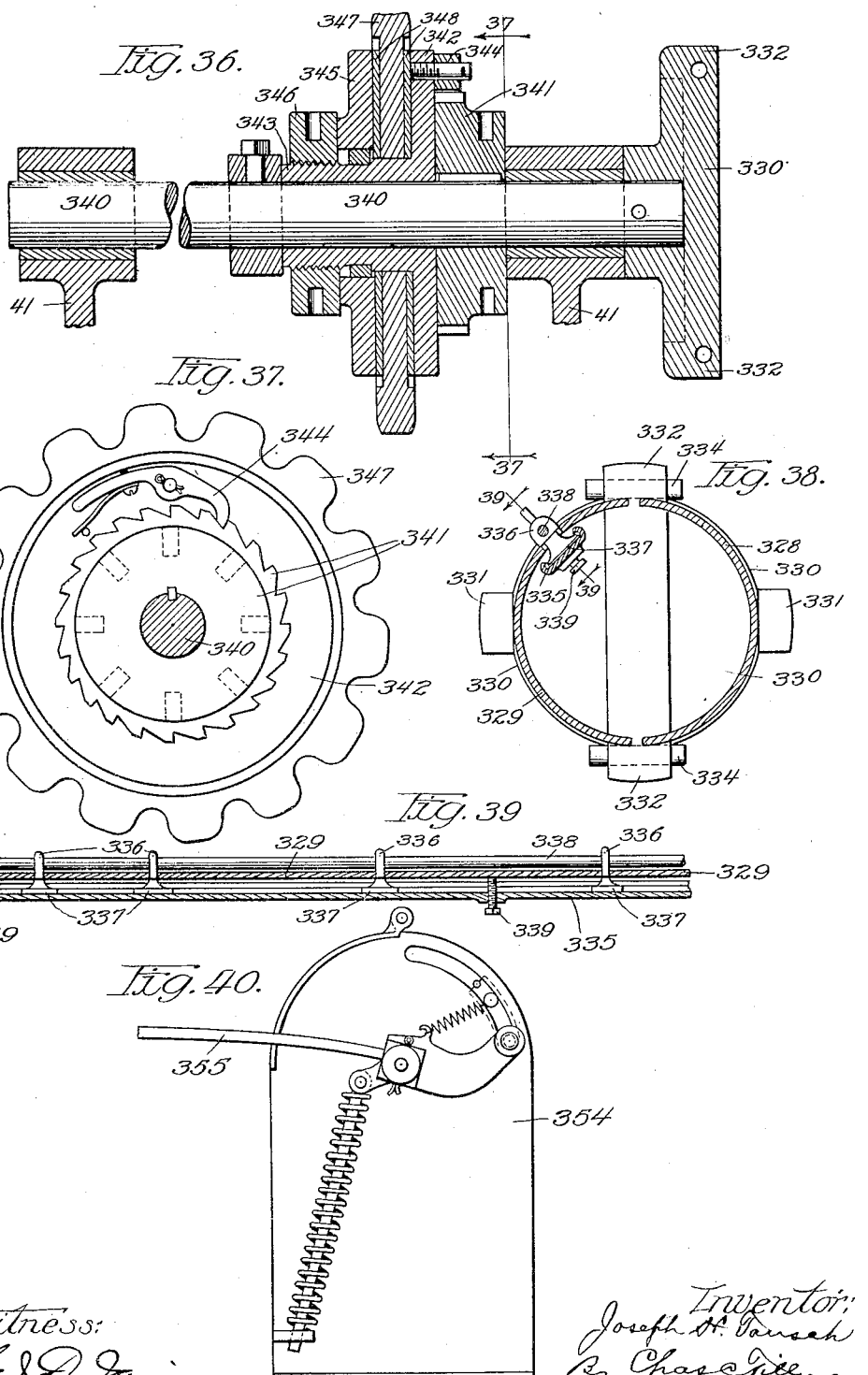

UNITED STATES PATENT OFFICE.

JOSEPH H. TAUSCH, OF CHICAGO RIDGE, ILLINOIS, ASSIGNOR TO GEORGE GORTON, OF RACINE, WISCONSIN.

FENCE-MACHINE.

1,351,810.  Specification of Letters Patent.  Patented Sept. 7, 1920.

Application filed January 24, 1916, Serial No. 74,010. Renewed January 28, 1920. Serial No. 354,751.

*To all whom it may concern:*

Be it known that I, JOSEPH H. TAUSCH, a subject of the Emperor of Germany, and resident of Chicago Ridge, in the county of Cook and State of Illinois, have invented certain new and useful Improvements in Fence-Machines, of which the following is a specification.

My invention relates to improvements in wire fence machines, and has for its object the provision of an improved machine of this character by means of which a durable and ornamental fence may be made with great rapidity and economy.

The invention consists in the combinations and arrangements of parts hereinafter described and claimed.

Figure 21:
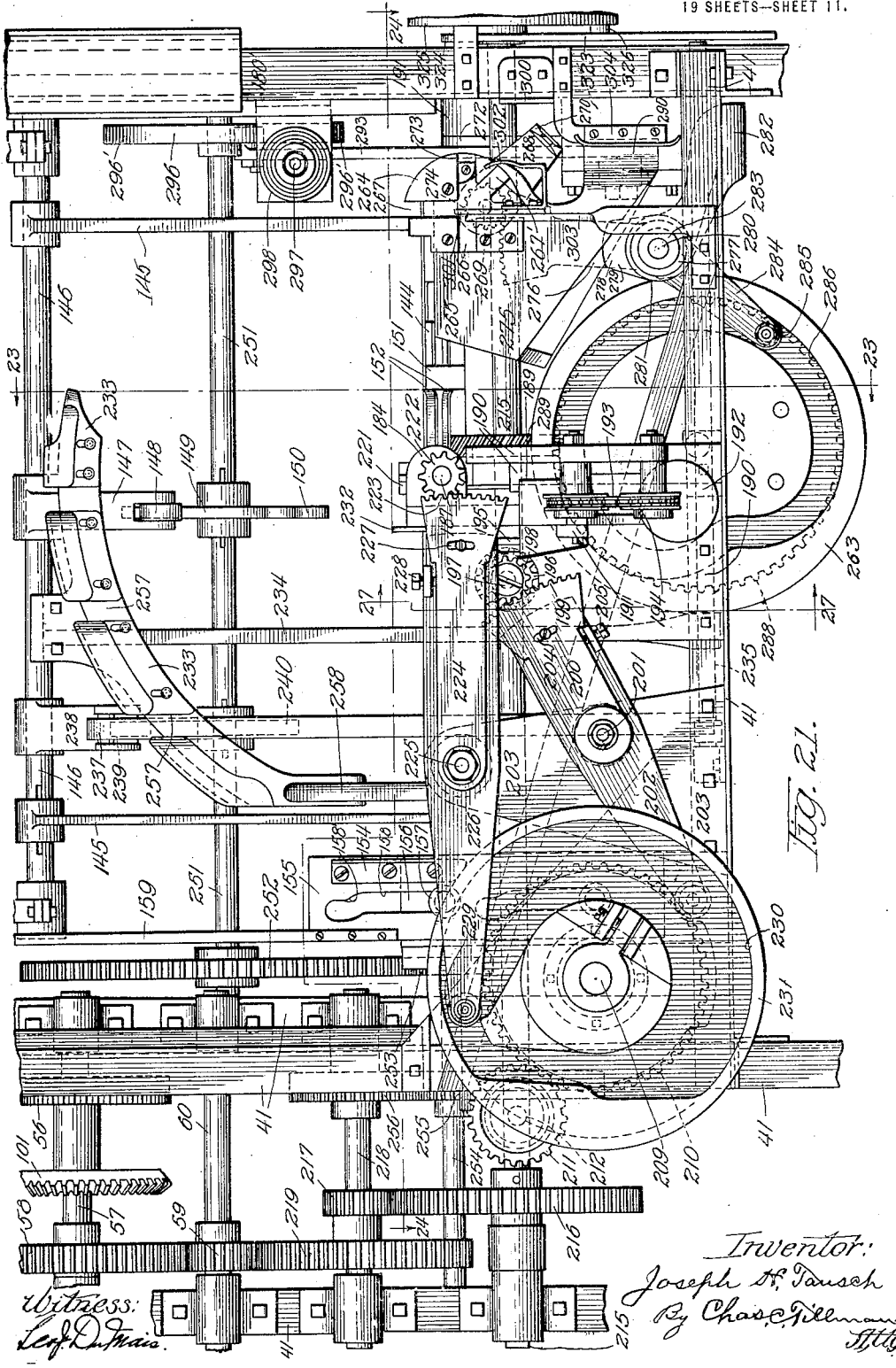
Figure 22:
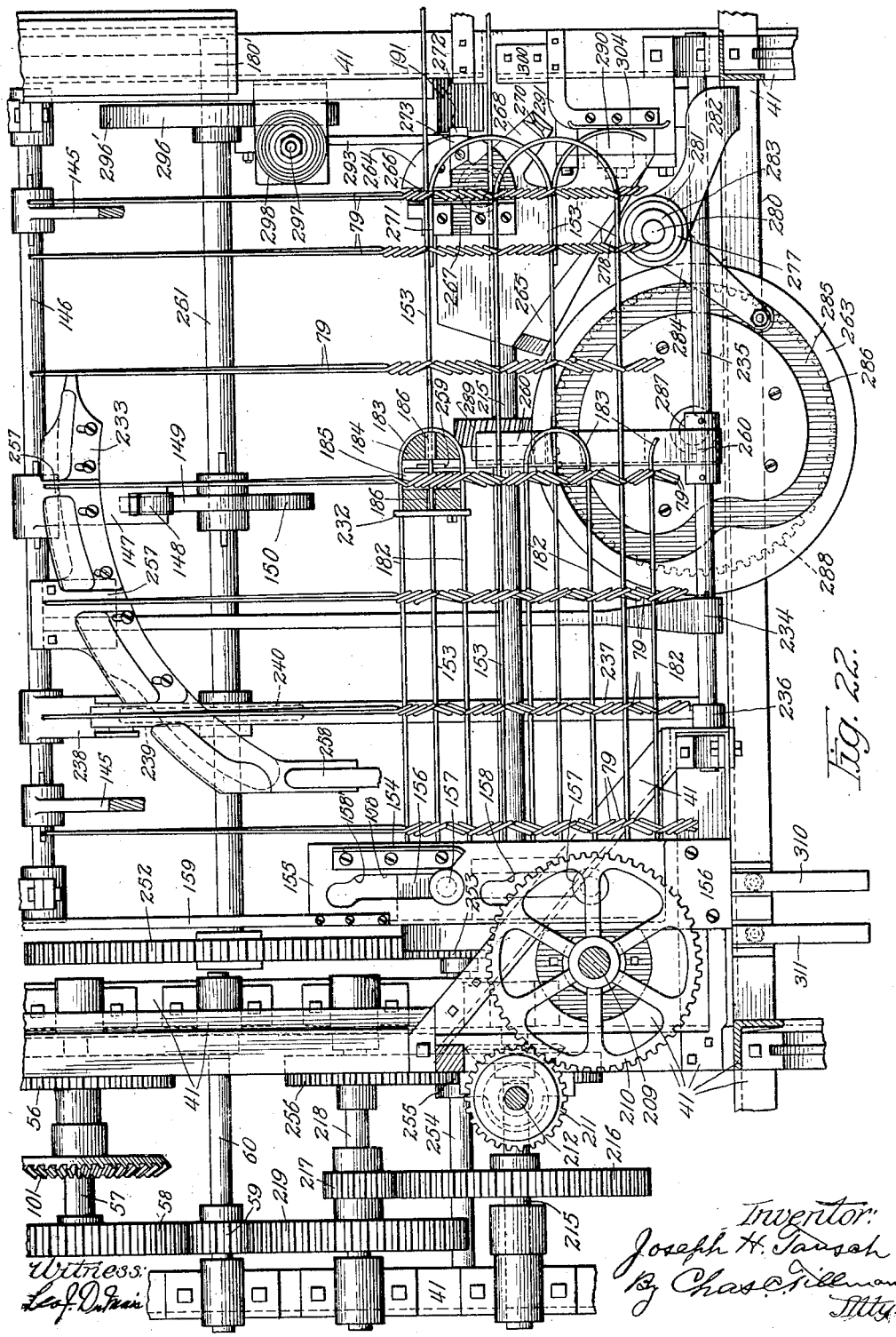
Figure 23:
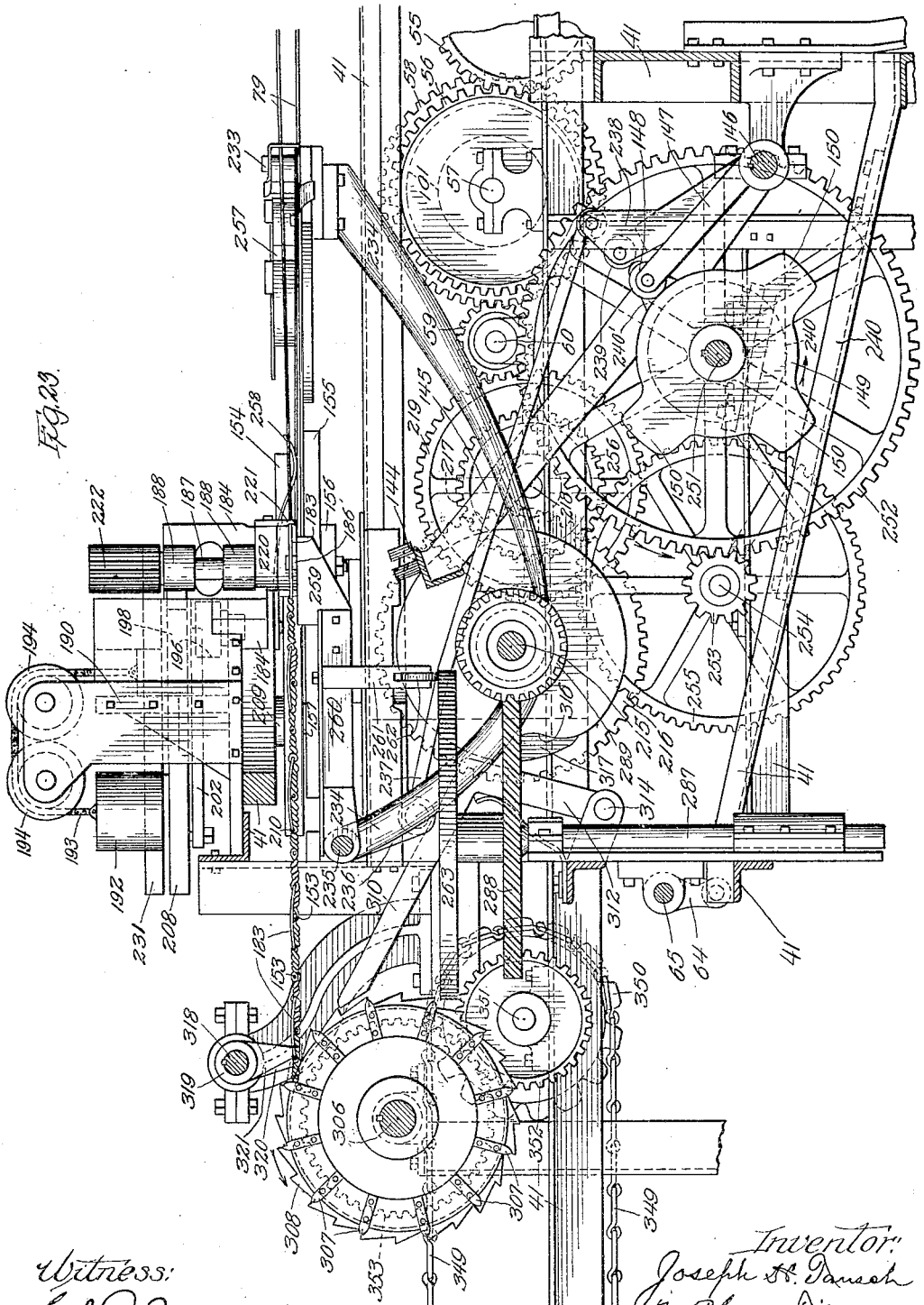
Figure 24:
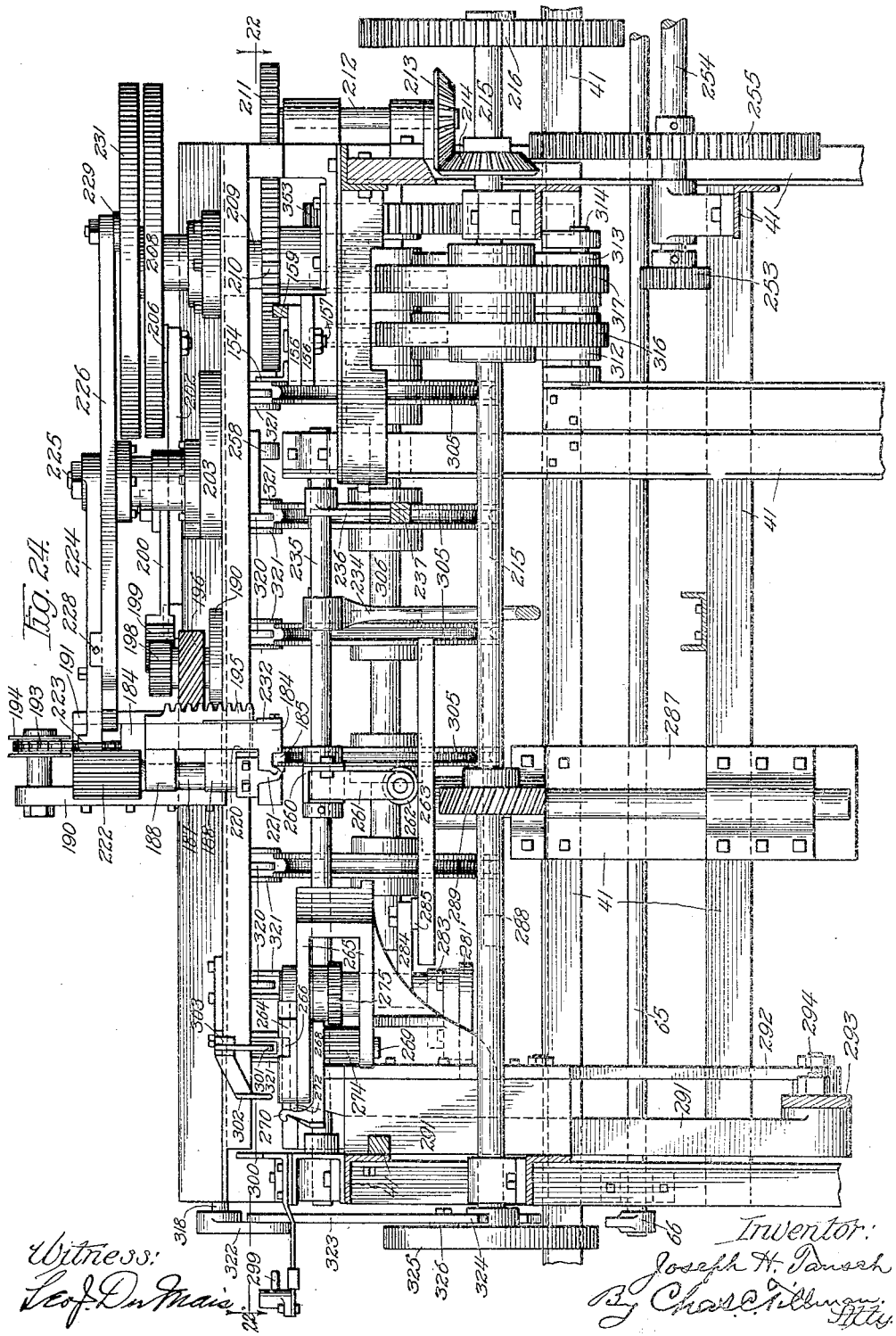
Figure 25:
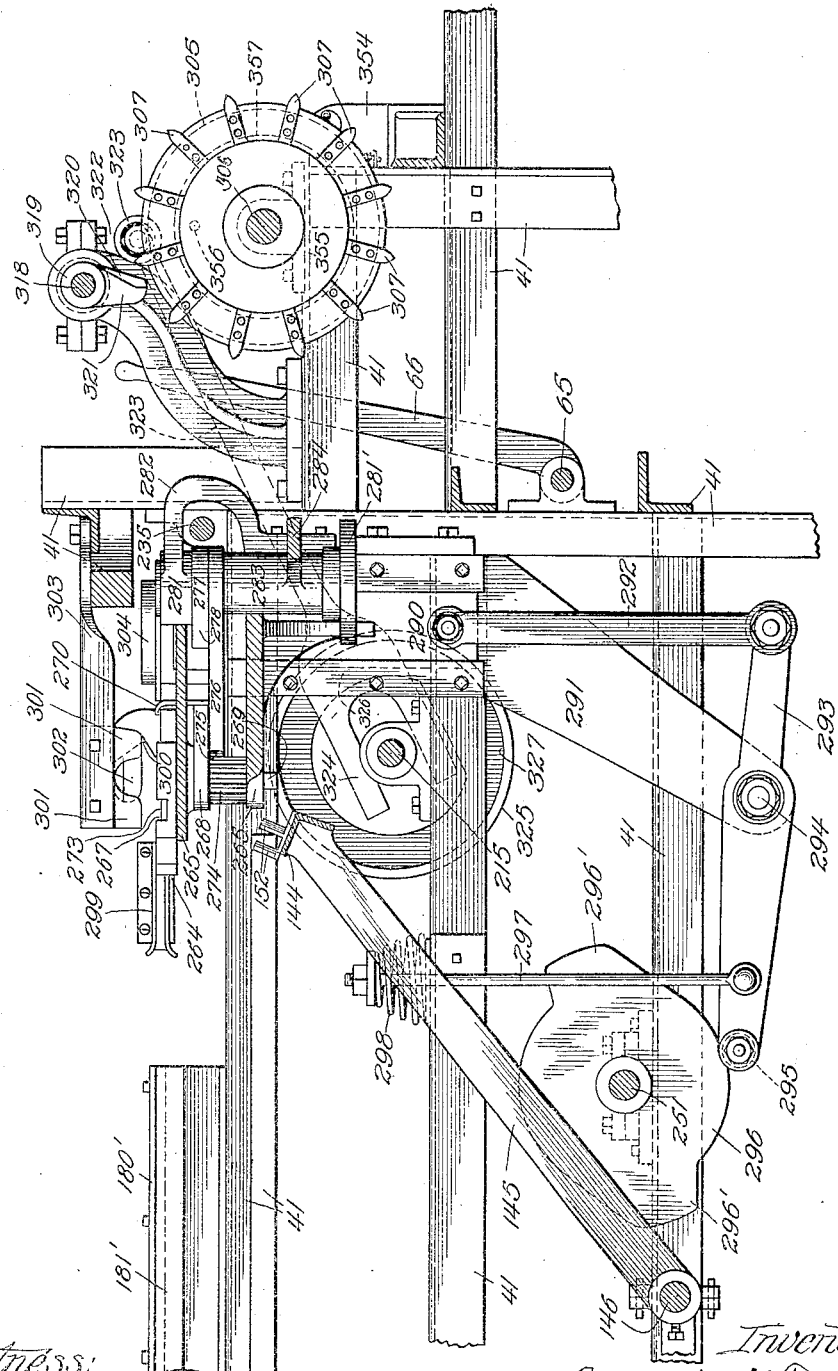
Figure 26:
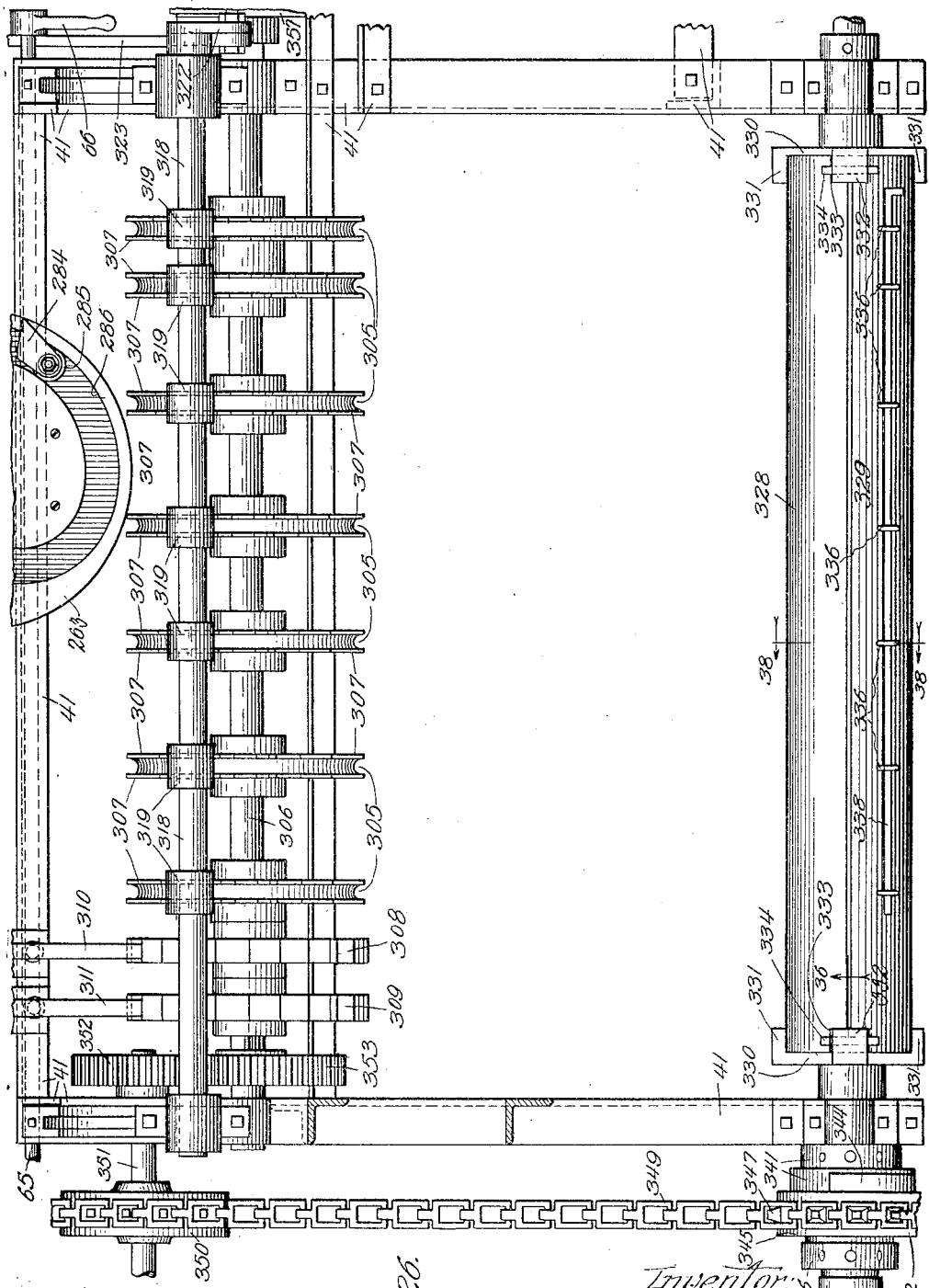

The invention will be best understood by reference to the accompanying drawings forming a part of this specification, and in which, Figure 1 is a top plan view illustrating a machine embodying my invention, Fig. 2, a side elevation of the same, Fig. 3, an elevation of the other side of the machine, Fig. 4, an enlarged top plan view of a portion of the machine illustrating a reciprocating carriage employed therein and associated parts, Fig. 5, a section taken on line 5—5 of Fig. 4, Fig. 6, an enlarged section taken on line 6—6 of Fig. 5, Fig. 7, a section taken on line 7—7 of Fig. 4, Fig. 8, a section taken on line 8—8 of Fig. 7, Fig. 9, a section taken on line 9—9 of Fig. 4, Fig. 10, a section similar to Fig. 9 with parts removed for the sake of clearness, Fig. 11, an enlarged section taken on line 11—11 of Fig. 4, Fig. 12, an enlarged section taken on line 12—12 of Fig. 4, Fig. 13, an enlarged detail view of a cam member employed for reversing the direction of rotation of certain twister heads employed in the machine, Fig. 14, an enlarged section taken on line 14—14 of Fig. 4, Fig. 15, a detail view illustrating a holding finger mounted on the reciprocatory carriage for temporarily holding pickets in place pending the securing thereof by twisting of the cables of the fence, Fig. 16, an enlarged front elevation of a portion of the reciprocating carriage illustrating a number of twister heads and the relative positions of fence pickets thereto, Fig. 17, an enlarged end view of one of a plurality of wire spacers employed in the machine, Fig. 18, a side view corresponding with Fig. 17, with portions broken away for the sake of clearness, Fig. 19, an enlarged side elevation of the rear end of the machine, Fig. 20, a longitudinal section taken through the rear end of the machine, Fig. 21, an enlarged top plan view of the central portion of the machine, Fig. 22, a horizontal section of the portion of the machine illustrated in Fig. 21, taken on line 22—22 of Fig. 24, Fig. 23, a section taken on line 23—23 of Fig. 21, Fig. 24, a section taken on line 24—24 of Fig. 21, Fig. 25, an enlarged section taken on line 25—25 of Fig. 1, Fig. 26, an enlarged top plan view of the front or discharge end of the machine.

Fig. 27, an enlarged detail view of the bending mechanism employed in the machine, Fig. 28, a bottom plan view of a cam member employed in conjunction with said bending mechanism, Fig. 29, an enlarged section taken on line 29—29 of Fig. 27, Fig. 30, a side view of feeding mechanism employed in the construction, Fig. 31, an enlarged section taken through one of a plurality of feeding sprockets in said feeding mechanism, Fig. 32, an enlarged top plan view of another bending mechanism employed in the construction, Fig. 33, a section taken on line 33—33 of Fig. 32, Fig. 34, a section taken on line 34—34 of Fig. 32, Fig. 35, a plan view of a picket guide or holder employed in the machine, Fig. 36, an enlarged section taken on line 36—36 of Fig. 26, Fig. 37, a section taken on line 37—37 of Fig. 36, Fig. 38, an enlarged section taken on line 38—38 of Fig. 26, Fig. 39, a partial section taken on line 39—39 of Fig. 38, and Fig. 40, an enlarged section taken on line 40—40 of Fig. 1.

The preferred form of construction, as illustrated in the drawings, comprises a suitable supporting frame 41 upon which is mounted a reciprocating carriage 42, carriage 42 being provided at its sides with angle-irons 43 which are slidably supported on the sides of frame 41, and rollers 44 being arranged at the four corners of said carriage to facilitate reciprocations thereof, as best illustrated in Figs. 4, 5 and 7. Longitudinal guide bars 45 are arranged under carriage 42 parallel with each other to form a guide slot 46 running upon a roller 47 arranged at the upper end of a vertical shaft 48 mounted in frame 41, as best illustrated in Figs. 5 and 8. The carriage 42 is reciprocated by means of a large horizontal cam 49 with the periphery of which rollers 50 and 51 located at the front and rear of said carriage contact, as best illustrated in Figs. 4 and 8. The cam 49 is shaped to cause forward movement of carriage 42 during substantially one-quarter of its rotation; then to hold the carriage stationary at the forward extremity of its motion for substantially one-quarter of its revolution; then to cause rearward movement of said carriage during substantially one-quarter of its revolution; and then to hold said carriage stationary at the rearward extremity of its movement during substantially one-quarter of a revolution, thus completing the cycle of operations caused by the cam 49. Shaft 48 carries a bevel gear 52 meshing with a bevel pinion 53 on a horizontal shaft 54 mounted in frame 41 and extending to the side thereof where it is provided with a gear 55, as best illustrated in Fig. 7. As indicated in Figs. 1, 3 and 4, gear 55 meshes with a gear 56 fixed to a shaft 57 mounted in frame 41 and carrying a gear 58 meshing with a pinion 59 on a shaft 60 also mounted in frame 41 and constituting the main driving shaft of the machine. Shaft 60 is provided adjacent its outer end with a clutch member 61 operable by a bell-crank 62 connected by means of a link 63 with a crank arm 64 on a shaft 65 extending transversely through the lower portion of the frame of the machine and provided with an operating handle 66 by means of which the clutch member 61 may be operated, as will be readily understood. Clutch member 61 is splined on shaft 60 and coöperates with a clutch member 67 on the inner face of a driving pulley 68 loosely mounted on shaft 60 and connected by means of a belt 69 with a pulley 70. Pulley 70 is mounted upon a shaft 71 which, as illustrated in Figs. 1 and 3, carries a pulley 72 connected by a belt 73 with a pulley 74 on the armature shaft of an electric motor 75 mounted on frame 41, as shown. By this arrangement, upon supplying current to motor 75, the pulley 68 will be driven at a comparatively slow speed but with great power. Upon shifting clutch 61 into engagement with clutch member 67, shaft 60 will be driven and the machine operated, as will be readily understood. Motion from shaft 60 is transmitted through pinion 59, and gears 58, 56 and 55, pinion 53, and gear 52 to shaft 48 for operating the cam member 49 to reciprocate the carriage, in a forwardly and rearwardly direction, for the purpose of convenience in description, the discharge or delivery end of the machine being considered the forward end thereof.

As best shown in Figs. 1, 4 and 7, a plurality of rotatable twister heads 76 and 77 are mounted upon the forward portion of carriage 42 in a transverse row with their axes extending forwardly and rearwardly of the machine. Each of the twister heads 76 is provided with two longitudinally extending wire openings 78 arranged parallel to and an equal distance on opposite sides of the axis thereof and a pair of wires 79 is extended through the openings in each of said twister heads, as best illustrated in Figs. 8 and 12. These wires constitute the longitudinal or cable members of the fence when twisted together by the twister heads, as will be readily understood. As best indicated in Figs. 4, 12 and 14, the twister heads 76 are provided with removable plates 80 at their forward ends and twister heads 77 with plates 81, the plates 81 being substantially twice as thick centrally as the plates 80 for a purpose which will be explained hereinafter. The plates 80 and 81 are provided with central oval openings 82 and 83 respectively to constitute what I term a twisting recess, as will be explained more fully hereinafter. Each of the twister heads 76 and 77 is provided centrally with a spiral gear 84 meshing with a companion spiral gear 85 mounted on a transverse shaft 86 arranged on carriage 42 under said twister heads, the spiral gears on adjacent twister heads being oppositely disposed, as shown in Fig. 4, so as to cause adjacent twister heads to always rotate in opposite directions. Shaft 86 is extended to the side of carriage 42 and provided with a bevel gear 87 meshing with a bevel gear 88 on a shaft 89 mounted in a bracket 89¹ secured to the side of said carriage. A gear 90 is rotatably mounted on a bracket 91 secured to frame 41 in axial alinement with gear 88 and shaft 89 is splined or feathered to gear 90 so as to permit of longitudinal reciprocations of carriage 42 while shaft 89 remains in driving relation with pinion 90.

As best shown in Figs. 4 and 5, pinion 90 is connected by an idler gear 90' with a pinion 92 fixed to a longitudinal shaft 93 arranged at the side of frame 41. A bevel gear 94 is loosely mounted on shaft 93 and rigidly connected with pinion 92 so as to cause movement of said gear and pinion in unison with each other, as shown in Fig. 6. Another and oppositely positioned bevel gear 95 is arranged on shaft 93 and an idler bevel gear 96 is arranged to mesh constantly with gears 94 and 95, as shown in Fig. 4. Gears 94 and 95 are provided with clutch members 97 and 98 coöperating with a clutch member 99 splined or feathered on shaft 93 between gears 94 and 95. Shaft 93 is constantly driven by means of a bevel gear 100 at the forward end thereof and meshing with bevel gear 101 on shaft 57, as shown in Fig. 1. The clutch member 99 is centrally grooved and engages an operating roller 102 carried by an oscillating arm 103 mounted on a transverse rock shaft 104 mounted in the frame of the machine, as best shown in Figs. 4 and 5. As best shown in Figs. 5 and 13, shaft 104 carries a rocker arm 105 connected by a link 106 with a rocker arm 107 on a shaft 108 carrying a rocker arm 109 provided with a roller 110. A cam wheel 111 is loosely mounted on a transverse shaft 112 in operative relation with roller 110, and a rocker arm 113 is also loosely mounted on shaft 112 adjacent cam wheel 111. Rocker arm 113 is provided with ears 114 embracing one of the spokes 115 of cam wheel 111 and setscrews 116 are provided in ears 114 for delicate angular adjustments of cam wheel 111 with respect to rocker arm 113. A disk 117 is fixed to shaft 112 adjacent rocker arm 113 and is provided with a plurality of adjusting holes 118 by means of which and a bolt 119 the arm 113 may be secured to disk 117 and consequently to shaft 112 in different angular relations, the arrangement serving as a means for delicately adjusting the cam wheel 111 on shaft 112. Cam wheel 111 is provided on its periphery with two radially extending cam projections 120 and two higher cam projections 121, said cam projections being arranged on said periphery ninety degrees apart as shown in Fig. 13. Radiating arms 122 and 123 are secured to one side of cam wheel 111, as indicated in Figs. 5 and 13, said arms being provided at their outer ends with inwardly extending cam projections 124 and 125 overlying the periphery of cam wheel 111 and coöperating with the cam projections 120 and 121, the cam projections 125 being smaller and distanced farther from the center of shaft 112 than the cam projections 124.

As best shown in Figs. 1 and 8, shaft 112 carries a worm wheel 126 meshing with a worm 126' on shaft 93 and by means of which shaft 112 is constantly rotated when the machine is in operation. The arrangement is such that as cam wheel 111 rotates in the direction of the arrow on Fig. 13, the roller 110 is successively engaged by the cam projections thereon, cam projections 124 serving to shift roller 110 inwardly from a neutral position to a position closely adjacent the periphery of cam wheel 111 and cam projections 120 serving to return said roller to neutral position. The connection of the roller 110 with the clutch 99 explained above, is such that this movement shifts said clutch into engagement with clutch 97 on gear 94 and thus places said gear 94 in direct connection with shaft 93, rotating the same therewith. As will be readily understood, this causes rotation of twister heads 76 and 77 in one direction. Likewise cam projections 121 and 125 coöperate to shift roller 110 from a neutral position outwardly and back again to neutral position thus temporarily placing clutch member 99 in engagement with clutch member 98 and reversing the direction of rotation of gear 90, thus reversing the direction of rotation of twister heads 76 and 77, as will be readily understood by those skilled in the art. The cam wheel 111 and the cam 49 are so timed that these rotations of the twister heads take place during the stationary period of the carriage at the forward end of its stroke. The cam projections 120 and 124 directly succeed each other on the periphery of cam wheel 111 and the cam projections 121 and 125 are similarly arranged, so that the twister heads 76 and 77 will be caused to rotate first twice in one direction at successive pauses of the carriage and then twice in the reverse direction, as will be readily understood and for a purpose to be hereinafter explained.

As best shown in Figs. 4 and 5, a bridge 127 is mounted on frame 41 spanning the path of travel of carriage 42 and twister heads 128 are mounted thereon, there being one of the twister heads 128 in co-axial alinement with each of the twister heads 76 and 77. The twister heads 128 are practically identical in construction with the twister heads 76 and 77 except that they are not provided with plates 80 and 81 but have longitudinal openings 129 extending therethrough to match with the corresponding openings in the twister heads 76 and 77. Each of the twister heads 128 is provided on its periphery with a spiral gear 130 set in the same manner as the spiral gear on the corresponding twister head 76 or 77. The spiral gears 130 intermesh with spiral gears 131 on a transverse shaft 132 arranged in bridge 127 under the twister heads thereon. At its end shaft 132 carries a bevel gear 133 meshing with a bevel gear 134 rigidly secured to gear 90. By this arrangement it will be observed that each twister head 128 will be caused to rotate in unison with the corresponding twister head 76 or 77 so as to prevent twisting of the wires 79 between the sets of twister heads so that twister heads 76—77 may reciprocate readily on wires 79.

As best shown in Figs. 1, 19 and 20, guide bars 135 are arranged at the extreme rear or entry end of the machine and the wires 79 are led through said guide bars into the machine. The wires pass thence over a tension bar 136 and a tension roller 137, bar 136 carrying arms 138 supporting another tension bar 139 on which is mounted a friction shoe 140 bearing downwardly on the wires 79 as shown in Fig. 20 and exerting resistance thereon to introduce tension into the wires as they pass through the machine. A ratchet 136' is secured to one end of the bar 136 and a pawl 138' is secured to the adjacent portion of the machine frame to engage said ratchet thus permitting of adjustments of the resistance on wires 79, as will be readily understood.

As best illustrated in Figs. 8, 17 and 18, separating blocks 141 are suspended between each set of wires 79, said blocks provided at top and bottom with grooves 142 to accommodate said wires and with rollers 143 contacting with said wires, said blocks being simply suspended between the wires to maintain each pair separated and serving to prevent twisting of the wires close to the twister heads 128 which would interfere with the free feed of the wires through said twister heads.

As best shown in Figs. 1, 21, 23, 25 and 35, a picket guide or holder 144 is mounted at the free ends of oscillatory arms 145 fixed to a rocker shaft 146 extending transversely through the lower portion of the machine. Shaft 146 carries a rocker arm 147 provided at its free end with a roller 148 riding upon the periphery of a cam 149 provided with cam projections 150, as best shown in Fig. 23. Cam 149 is fixed to a transverse shaft 251 which is constantly rotated during the operation of the machine, as will be explained more fully hereinafter. The arrangement is such that at proper intervals the picket guide or holder 144 will be oscillated upwardly into operative relation with the wires 79 so as to assist in the insertion of pickets therebetween. The picket guide 144 is made up of a plurality of channel members set some distance apart so as to provide spaces 151 to receive the wires 79, and the edges 152 of said channel members are flared outwardly to facilitate the insertion of pickets therein. It will be seen that cam member 149 is provided with three cam projections 150 set ninety degrees apart, and the shaft 251 is so timed as to cause elevation and depression of the picket guide 144 just prior to three successive forward movements of the carriage 42 but not before the fourth forward movement of said carriage, as will be readily understood and for a purpose to be hereinafter more fully explained. The pickets employed in the fence are sinuously bent before insertion, one of said pickets being illustrated in Fig. 34 and marked with reference numeral 153. The arrangement is such that the guide 144 may be utilized in the insertion of three successive pickets between the wires 79, said pickets being then secured to the fence by twisting the wires 79 through the medium of the twister heads 76 and 77.

As best illustrated in Figs. 21, 22 and 24, a stop 154 is arranged to coöperate with the inner end of picket holder 144 to limit the inward movement therein and to assist in properly alining said pickets in the fence. This stop member is mounted upon a reciprocatory plate 155 slidably mounted upon a bracket 156 secured to the frame of the machine. The plate 155 is secured to the bracket 156 by means of screws 157 taking through slots 158 in said plate so as to permit of longitudinal movement of the stop 154.

Each of the slots 158 is provided at or near corresponding ends with a lateral offset or enlargement 158¹ to allow of lateral movement of the plate 155 and stop 154 so as to line up the ends of the pickets which are adapted to contact with the stop 154 in weaving the fence.

A bar 159 is secured to the rear end of plate 155 and passes loosely through a slot 160 in an angle plate 161 secured to the front of the carriage 42, as indicated in Figs. 4 and 7. A stop pin 162 is arranged in bar 159 behind plate 161 and a tension spring 163 is connected with the rear end of bar 159 and with a pin 164 on a bar 165 secured to the bridge 127. The arrangement is such that stop 154 will normally rest at the end of picket holder 144, but upon the approach of the carriage, the plate 155 is engaged by the plate 161 and stop 154 is forced forwardly thereby so as to permit the twister heads 76—77 to approach a picket closely before twisting the wires 79.

As best shown in Figs. 4, 7 and 12, positioning fingers 166 are secured to the forward portion of the carriage 42 to project slightly forwardly therefrom and are provided on their under sides with beveled noses 167 adapted to engage the pickets inserted between wires 79. At the time of the approach of the fingers 166, the pickets are resting between the wires 79, and the fingers 166 are designed to engage certain sinuosities or bends in said pickets to position the same in the fence. The fingers 166 are mounted upon an angle bar 168 secured to the front of a laterally reciprocatory plate 169 slidably supported by means of U-shaped hangers 170 on a plate 171 secured to the forward side of carriage 42. A slot 172 is formed through plate 169 and a reinforcing plate 173 arranged at the front thereof and an eccentric 174 is arranged in said slot on a shaft 175 rotatably mounted in carriage 42, as best shown in Figs. 4 and 7. As best shown in Fig. 11, the shaft 175 carries at its rearward end a ratchet 176 provided with eight equally spaced ratchet teeth. A spring-held pawl 177 rides upon the periphery of ratchet 176 and is pivoted to the end of a reciprocatory bar 178 having an extension 179 carrying a cam roller 180 operating in a cam groove 181 arranged in the under side of a bar 181' suspended in brackets 180' secured to the frame 41 at the side of carriage 42. As shown in Fig. 4, the cam groove 181 is in shallow V-form, so that upon each movement of the carriage 42 forward or back, a complete reciprocation of bar 178 will be effected, and each reciprocation of bar 178 causes the stepping up of ratchet 176 through an angle to the distance between two of its teeth. In the initial step in producing a fence by the use of the machine, the eccentric 174 is so arranged on the shaft 175 that at the starting of the machine, the ratchet 176 will cause the finger 166 to engage certain sinuosities in a picket in a picket holder 144. Upon the next rearward and forward movement of the carriage, it will, through the instrumentality of the ratchet 176 and eccentric 174 cause the shifting of the fingers 166 to the right of the position shown in Fig. 7 a sufficient distance to cause said fingers to engage the next adjacent bend in the picket in the picket guide 144. The action of the beveled noses of the fingers 166 on the pickets is to cause the bend engaged to turn downwardly, as shown in Fig. 16, so that the shifting of the fingers 166 to engage adjacent bends of the pickets causes reversal of the position of the pickets, as indicated in dotted lines in Fig. 16. Reversing of the positions of the pickets causes their lower ends to extend beyond the lowermost cable of the fence in opposite directions, as indicated in Figs. 16 and 22, so as to tend to prevent the stripping of the lowermost cable from said pickets, as will be readily understood. The next rearward movement of the carriage causes an idle movement of the fingers still farther to the right, as indicated in Fig. 7, and the next forward movement of the carriage causes return of the fingers to their last operative position, so that said fingers are caused to assume at first two successive positions which will position pickets similarly and then two successive positions which will position pickets oppositely, the pickets thus being arranged in oppositely positioned pairs, with the ends of the pickets in each pair projecting oppositely with respect to the lowermost cable of the fence. As will be explained hereinafter, one position of the fingers 166 is an idle one since the picket operated upon at the time has been previously properly set in the fence.

The form of fence designed to be made by the particular form of machine illustrated in the drawings, is illustrated in Fig. 22, and is one in which certain of the pickets 182 are doubled centrally upon themselves at 183, the doubled-back end being interwoven in the fence to constitute a short picket therefor, thus producing an ornamental effect through the center of the fence and also making a closer mesh at the bottom thereof. To effect this bending, or doubling back of the pickets 182, I provide a vertically reciprocatory bending head 184, best shown in Figs. 21, 22, 23, 24, 27 and 29. This bending head is arranged centrally over the central portion of the machine and is provided in its bottom face with a longitudinal groove 185 adapted to receive the corresponding longitudinal cable of the fence and a laterally extending groove 186 adapted to receive the corresponding picket of the fence when said bending head is lowered into operative position. At one side the groove 186 is provided with a downwardly extending projection 186' which is arranged to contact with the corresponding picket and depress the same to facilitate the doubling back of the picket 182. The head 184 carries a vertical shaft 187 rotatably mounted in lugs 188 formed on one side thereof. The head 184 is substantially U-shaped in horizontal section and is slidably mounted in a guide groove 189 formed in a bracket 190 secured to the frame of the machine. The head 184 is slidably retained in the groove 189 by means of a guide bar 191, as shown. A balance weight 192 is connected by a chain 193 passing over guide rollers 194 with the upper portion of the head 184 in guide groove 189 to facilitate manipulations of said head. The head 184 carries a spiral rack 195 meshing with a spiral gear 196 rotatably mounted upon a stud shaft 197 and rigidly connected with the pinion 198, as illustrated in Fig. 29. Pinion 198 meshes with a segmental gear 199 formed upon the end of an arm 200 pivotally mounted at 201 on the fulcrum of a lever 202 mounted on a bracket 203 secured to the frame of the machine, as best illustrated in Fig. 21. The arm 200 is adjustably connected by means of a slot and bolt connection 204 with the lever 202 and a set-screw 205 contacting with the side of arm 200 permits of fine adjustments thereof. The lever 202 carries a roller 206 running in a cam slot 207 formed in the bottom of a cam 208 secured to a vertical shaft 209, as best illustrated in Figs. 21 and 28. As best shown in Fig. 24, the shaft 209 carries a gear 210 meshing with a pinion 211 on a vertical shaft 212 carrying a bevel gear 130

213 meshing with a bevel gear 214 on a transverse shaft 215. As best illustrated in Figs. 21 and 23, the gear 216 meshes with a pinion 217 on shaft 218 carrying a gear 219 meshing with pinion 59 on the main power shaft 60 of the machine. The arrangement is such that at the proper time in the operation of the machine, the bending head 184 is lowered into engagement with the cables and pickets of the machine with an unbent picket 182 resting against the forward side of said bending head, such lowering motion being transmitted to the bending head through the cam 208, the lever 202, the segment gear 199, the pinion 198 and the spiral gear 196 operating on the spiral rack 195, as will be readily understood.

Shaft 187 carries a bending arm 220 provided with a bending finger 221 at the free end thereof, said bending finger being adapted to engage the forward side of a straight picket 182 and bend said picket around said head, as shown in Fig. 22 when shaft 187 is rotated. The shaft 187 is rotated through the medium of a pinion 222 meshing with a segmental gear 223 formed upon the end of an arm 224 pivoted at 225, which is also the fulcrum of an operating lever 226. The arm 224 is adjustably connected with lever 226 as shown in Fig. 21 by means of a screw and slot connection 227 for holding the said arm and lever together and a set-screw 228 is provided for effecting fine adjustments. The lever 226 carries a roller 229 operating in a cam slot 230 formed in the top of a cam 231 fixed to shaft 209. A gravity operated dog or catch 232 is pivoted to one side of the head 184 in position to automatically engage with the bent end of a picket 182 and hold the same in bent relation after the finger 221 has been redrawn through the action of cam 231, as will be readily understood.

As best shown in Figs. 21, 22 and 23, a curved picket end guide 233 is mounted at the free end of an oscillatory curved arm 234 fixed to a rock shaft 235 carrying a rocker arm 236 connected by means of a link 237 with a rocker arm 238 loosely pivoted on shaft 146 and carrying a cam roller 239 riding upon the periphery of a cam 240 provided with a single cam projection 240', as illustrated in Fig. 23. Cam 240 is fixed to the transverse shaft 251 carrying a gear 252 meshing with a pinion 253 on a shaft 254. Shaft 254 carries a gear 255 meshing with a gear 256 on the shaft 218 driven as explained above. Guide member 233 is in channel form with its open side forward and provided with notches 257 to accommodate the wires 79 when said guide member is rocked upwardly into the position shown in Fig. 23. A supplemental spring guide 258 is provided, as shown in Figs. 21 and 22, to coöperate with guide 233. The arrangement is such that just before the picket 182 is bent around the head 184, as explained above, cam projection 240' operates to elevate guide 233 into guiding position to receive the end of said picket 182 and in conjunction with guide 258 to guide the same between the different sets of wires 79 when dog 232 automatically engages said picket to hold it in bent condition until secured by twisting of the wires 79. A supporting table 259 is arranged below bending head 184 to constitute a support for the fence wires at this point, said supporting table being carried by an arm 260 loosely mounted on shaft 235 and held in horizontal position by means of a post 261 provided with a roller 262 riding on the upper face of a cam 263. The upper face of cam 263 is horizontal and smooth so as not to effect any movement of supporting table 259, this arrangement being provided simply to hold the supporting table 259 in a fixed position.

As best illustrated in Figs. 22, 32, 33 and 34, another bending head 264 is arranged under the path of travel of the fence fabric at the right-hand side of the machine, as illustrated in Fig. 22, said bending head being arranged to be elevated into engagement with the wires and pickets of the fence periodically. The bending head 264 is supported in the arms of a bracket 265 and is provided in its upper face with a transverse groove 267—267' adapted to receive the pickets of a fence and a longitudinal groove 266 adapted to receive the corresponding cable of the fence. A bending arm 268 is keyed to a shaft 269 and is provided with a bending finger 270 adapted to engage the projecting end 271 of a picket 153 and bend the same around head 264, as indicated in Fig. 32, upon rotation of arm 268. Mounted on the forward side of the carriage 42 is a holding finger 270' which, when the carriage approaches the forward limit of its movement, engages the bent end 271, as indicated in Fig. 15, to hold the same in bent relation after finger 270 is removed. A bevel nose 272 is arranged at the side of head 264 and the bent end 271 strikes this nose as it is bent around head 264 and is forced upwardly and held in proper position to enter between wires 79. Likewise groove 267 is provided with a raised portion 273 adjacent its outer end which, contacting with the corresponding protruding end of the picket therein, elevates the same to cause the bent end 271 to pass thereunder, as indicated. The shaft 269 carries a pin 274 meshing with a segmental gear 275 formed on the end of an oscillatory arm 276 carrying a sleeve 277 provided with a flange 278 secured to arm 276 by means of screws 279. The arm 276 is pivotally mounted on a shaft 280, as indicated in Figs. 32 and 33. The sleeve and shaft are mounted in bearings 281 and 281' in a bracket 282 secured to the frame of the machine. A sleeve 283 is also secured to shaft 280 and is provided with a rocker arm 284 carrying a roller 285 running in a cam slot 286 formed in the upper surface of cam 263, said cam 263 being fixed to a vertical shaft 287 carrying a spiral gear 288 meshing with a spiral gear 289 on shaft 215, as shown in Fig. 23. By this arrangement, it will be observed that the arm 268 and finger 270 will be revolved to effect bending of the end 271 of the picket resting against the forward side of head 264. The cam 263 is so timed and designed as to cause this movement just after bending head 264 is elevated into operative position.

To elevate bending head 264, the same is mounted on a plate 290 which is vertically slidable in a guide 291 and connected by means of a link 292 with a lever 293 fulcrumed at 294 on bracket 291. Lever 293 carries a cam roller 295 running upon the periphery of a cam 296 provided with two cam projections 296' and secured to shaft 251. A link 297 is also connected with lever 293 and bears against a compression spring 298 and by means of which cam roller 295 is kept in contact with the periphery of cam 296 and bending head 264 but is elevated by the action of cam projections 296', as will be readily understood. In addition to the above mentioned action of said spring, the same assists in drawing the head down after the picket is bent around the form or head 264, and is so tensioned or arranged as to be loose or inactive when the head has reached its lowermost limit. The arrangement is such that bending head 264 will be elevated into operative position to bend each of the protruding ends of pickets 153 into engagement with the corresponding cables of the fence, as indicated in Fig. 32. A channel guide 299 is provided for the protruding ends of pickets 153 and a stop member 300 provided with a V-shaped recess is positioned to receive the protruding ends of the pickets and properly position the same for engagement by finger 270. Stops 301 and 302 are arranged to hold the picket ends against bending upwardly during the process of bending, said stops being mounted on a bracket 303, and a guide member 304 is provided for the bent over ends of the pickets, as illustrated in Figs. 25 and 32.

As best shown in Figs. 25, 26, 30 and 31, a plurality of grooved sprocket wheels 305 are secured to a transverse shaft 306 arranged in the forward portion of frame 41, and a plurality of sprocket teeth 307 are secured to the sides of wheels 305 and are adapted to engage the rearward sides of the pickets of the completed fence to effect feeding of the fence through the machine, the grooves in the wheels 305 serving to accommodate the cables of the fence, as indicated in Fig. 31. Ratchets 308 and 309 are secured to shaft 306 and pawls 310 and 311 coöperate therewith. Each of the pawls 310 and 311 is carried by a spring-held rocker arm 312—313 pivoted at 314 to the frame of the machine, and provided with a roller 315. The roller 315 for pawl 310 rides upon the periphery of a cam 316, and the roller 315 for pawl 311 rides upon a cam 317, both of said cams being fixed to the shaft 215. By this arrangement, it will be observed that pawl arm 310 will operate to rotate shaft 306 intermittently to draw the fence fabric through the machine, and that pawl 311 will serve as a check pawl to prevent retrograde movements of said shaft.

A rocker shaft 318 is arranged above sprocket wheels 305 and carries a plurality of heads 319 fixed thereto, one of said heads being arranged above each of the sprocket wheels, as shown. Each of the heads 319 carries a depending rocker arm 320 adapted to rest upon the top of the corresponding fence cable and a companion rocker arm 321 adapted to rest against the rearward side of the pickets of the fence fabric, as indicated in Fig. 31. As shown in Fig. 26, rocker shaft 318 carries a rocker arm 322 pivotally connected to one end of a link 323 having a bifurcated jaw 324 slidably engaging over shaft 215. A cam 325 is fixed to shaft 215 and link 323 is provided with a cam roller 326 running in a cam groove 327 in the face of cam 325. The cam 325 is so timed and shaped as to effect oscillation of shaft 318 and consequently of arms 320 and 321 to coöperate with the teeth on the corresponding sprocket wheel 305 to effect positive feeding of the fence fabric and prevent the cables and pickets from springing upwardly so as to disengage from the teeth of the sprocket.

As best illustrated in Figs. 26 and 38, a winding drum is arranged at the extreme front end of the machine to wind up the fence fabric as manufactured. This drum is made in two semi-cylindrical halves 328 and 329 mounted in rotatable heads 330, said heads being provided with pairs of lugs 331 and 332 embracing the ends of said drum. The drum ends are provided with notches 333 adapted to pass over the lugs 332 and securing pins 334 are passed through the lugs 332 to prevent such passage, lugs 332 engaging in notches 333 so as to compel the parts to move together. Arranged within the drum portion 329 is a channeled securing bar 335 and a plurality of eyes 336 having T-heads 337 are arranged to pass through corresponding openings in the drum wall and receive a securing rod 338, as shown in Figs. 38 and 39. Set-screws 339 are provided in bar 335 to properly position the same from the inner wall of the drum. By this arrangement, it will be observed that the wires 79 may be passed under the securing rod 339 and bent upwardly over such rod to secure said wires to said drum. After the fence fabric is wound upon the drum, the pins 334 are withdrawn from one set of the lugs 332 whereupon the drum may be removed with the wire wound thereon. Then, by withdrawing rod 338, the eyes 336 will drop within the drum and the drum will be readily removed from the roll of fence fabric and will be placed in the machine for further use. The heads 330 are mounted upon suitable shafts in the fence and one of said shafts 340 is extended at one side to facilitate driving of the drum. A ratchet wheel 341 is keyed to shaft 340, as shown in Fig. 36, and a disk 342 is loosely mounted on shaft 340 adjacent ratchet 341 and provided with a sleeve 343 and a pawl 344 cooperating with ratchet 341, as shown. Another disk 345 is splined or feathered on sleeve 343 and a binding nut 346 is threaded on sleeve 343 adjacent disk 345. A sprocket wheel 347 is interposed between disks 342 and 345 and is provided with leather friction facings 348, as indicated. A sprocket chain 349 connects sprocket wheel 347 with a similar sprocket 350 on shaft 351. Shaft 351 carries a gear 352 meshing with a gear 353 on shaft 306. By this arrangement, it will be observed that the winding drum will be operated in unison with shaft 306 to wind the fence fabric thereon, but that owing to the frictional engagement of sprocket 347 with shaft 340, the sprocket 347 is free to slip so as to compensate for the increasing diameter of the roll on the winding drum, as will be readily understood.

As shown in Figs. 1, 2 and 40, a registering device 354 of conventional construction is mounted in the frame of the machine with its operating arm 355 set in the path of pins 356 projecting from the face of a disk 357 mounted on the end of shaft 306 and by means of which the length of fence passing over sprocket wheels 305 may be registered, as will be readily understood.

In operation, the machine is driven until the shaft 251 rotates in the direction indicated by the arrow on Fig. 23, through substantially an angle of ninety degrees, and the roller 148 is resting upon the top of the first cam projection 150 on the cam 149. In this position of the parts, the picket guide 144 will be raised up into operative position, the carriage redrawn to its rearwardmost position and the parts ready to operate in making the fence. Then the wires 79 are threaded through the machine, as indicated, and secured at their front ends to the teeth 307 of the sprocket wheels 305. Then long picket 153 is placed in the picket guide and the machine is started, and as the carriage moves forwardly, the picket guide 144 drops out of the way and the fingers 166 engage certain sinuosities in the picket, positioning said picket with its protruding end turned downwardly and holding it in this position while the twister heads 76 and 77 twist the wires 79 to lock it in position. Just before the twisters start to perform the twisting of the wires 79, the machine is stopped, and the wires are given a preliminary twist by hand in front of the picket to prevent said picket from moving forwardly. Then the machine is again started, the sprockets 305 operating in the meantime to feed the wires 79 forwardly through the machine a distance equal to the distance between two adjoining pickets. The oval openings 82 and 83 in plates 80 and 81 form twisting recesses to facilitate the twisting. The carriage then withdraws and the picket guide again rises and a short picket 182 is placed in the picket guide, care being taken, however, to see that this picket is not threaded between the first three sets of wires 79 illustrated at the right-hand side of Fig. 22. The carriage again advances, the fingers 166 shifting to engage adjacent sinuosities in the picket to position the same reversely to the first secured picket, and this picket is secured in position as before, the carriage withdrawing. It will be observed that the twister heads rotate in the same direction as for the previous securing of the picket, thus giving the three upper cables a continuous twist in the same direction, since owing to the absence of a picket therein, if the twister heads were reversed at this point, these three cables would be untwisted again, as will be understood. The bending head 264 then ascends and goes through its cycle of movements, but in this instance this cycle of movements is idle ones, since there is not then present a picket in the fence properly situated to have its end bent around and secured as explained above. Then a long picket 153 is placed in the guide threaded through all of the cable wires and secured in place as before, the carriage withdrawing. During this operation the fingers 166 stand still to engage the same sinuosities in the picket as in the previous operation, thus positioning the picket the same as the previous picket. However, the direction of rotation of the twister heads is reversed so as to partially unwind the twist placed in the wires 79 by the twister heads 128 and between said twister heads and the rear of the machine. Then the bending head 184 descends and at the same time guide 257 comes up and the end of picket 182 is bent around into engagement with the four corresponding cable wires. Advance of the carriage again shifts the fingers 166 to engage the proper sinuosities in the bent end of the picket 182, but the picket guide does not rise to operative position before this advance of the carriage, since no new picket is inserted. The twister heads again rotate in the same direction as in the previous operation, securing the bent end of picket 182 and completely removing the twist from the rear portion of the wires 79. The carriage then withdraws and the picket guide 144 and bending head 264 are elevated to bend the protruding end of the first inserted long picket around into engagement with the two adjacent cable wires, as illustrated in Fig. 32 and explained above. Then a long picket 153 is inserted in the picket guide, being threaded through all of the cable wires and the carriage advances. When the finger 270 is removed from contact with the bent end of the long picket 153, the finger 270' on the carriage engages said end and the corresponding picket and holds them in place until the twister heads operate to secure them by twisting the wires 79 thus completing the cycle of operations of the machine.

It will be observed that during this last operation, and during each succeeding similar operation, two picket ends must be secured by the two uppermost cables, and in order to form the loops or twists therefor, of sufficient size to receive the two pickets and so that the axis of the longer picket will be in a straight line the centrally thicker plates 81, before mentioned, are placed upon the twister heads 77 to compensate for the extra thickness caused by the two thicknesses of pickets, as illustrated in Figs. 12 and 14. After the withdrawal of the carriage, a new long picket may be inserted and the above cycle of operations repeated with the exception that the next operation of the bending head 264 will not now be an idle one since there is a picket end present to be bent. As explained above, adjacent twister heads 76—77 rotate in opposite directions thus causing opposite twisting of adjacent cables and consequent interlocking of the pickets therein. As before stated, in the initial steps of making fence, the wires 79 are secured at their front ends to the teeth 307 of the sprocket wheels 305, and said wires are so connected until a sufficient amount thereof has been woven to reach from the sprocket wheels to the winding drum comprising the two members 328 and 329, when the secured ends of said wires are severed, and the front end of the fabric is secured to the drum in the manner above described, when it is apparent the woven fabric or fence will be wound on the drum as it is completed.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having described my invention what I claim as new and desire to secure by Letters Patent is:

1. In a twisted cable and picket fence machine, means for feeding a plurality of pairs of wires therethrough, means for positioning pickets between said wires, and reciprocating twister heads arranged to closely approach a positioned picket and twist said wires to secure the same in place, substantially as described.

2. In a twisted cable and picket fence machine, means for feeding a plurality of pairs of wires therethrough, means for positioning pickets between said wires, reciprocating twister heads arranged to closely approach a positioned picket and twist said wires to secure the same in place, and means for feeding said wires during such twisting, substantially as described.

3. In a twisted cable and picket fence machine, means for feeding a plurality of pairs of wires therethrough, means for positioning pickets between said wires, reciprocating twister heads arranged to closely approach a positioned picket and twist said wires to secure the same in place, a second set of twister heads for said wires, and means for operating said sets of heads in unison with each other, substantially as described.

4. In a fence machine, a reciprocating rotatable twister head, a rotatable twister head distanced therefrom and coöperating therewith, and means for rotating said heads in unison with each other and alternately in opposite directions, substantially as described.

5. In a fence machine, a frame, a reciprocating carriage on said frame, a plurality of rotatable twister heads on said carriage, a plurality of rotatable heads on said frame coöperating therewith, and means for rotating said heads in unison with each other, substantially as described.

6. In a fence machine, a frame, a reciprocating carriage on said frame, a plurality of rotatable twister heads on said carriage, a plurality of rotatable heads on said frame coöperating therewith, and means for rotating said heads in unison with each other and alternately in opposite directions, substantially as described.

7. In a fence machine, a reciprocating rotatable twister head provided with wire openings extending therethrough parallel with and on opposite sides of the axis thereof, a rotatable twister head distanced therefrom and coöperating therewith, and provided with wire openings extending therethrough parallel with and on opposite sides of the axis thereof, and means for rotating said heads in unison with each other, substantially as described.

8. In a fence machine, a reciprocating rotatable twister head provided with wire openings extending therethrough parallel with and on opposite sides of the axis thereof, a rotatable twister head distanced therefrom and coöperating therewith, and provided with wire openings extending therethrough parallel with and on opposite sides of the axis thereof, and means for rotating said heads in unison with each other and alternately in opposite directions, substantially as described.

9. In a fence machine, a frame, a reciprocating carriage on said frame, a plurality of rotatable twister heads on said carriage provided with wire openings extending therethrough parallel with and on opposite sides of the axis thereof, a plurality of rotatable twister heads on said frame coöperating therewith and provided with wire openings extending therethrough parallel with and on opposite sides of the axis thereof, and means for rotating said heads in unison with each other, substantially as described.

10. In a fence machine, a frame, a reciprocating carriage on said frame, a plurality of rotatable twister heads on said carriage provided with wire openings extending therethrough parallel with and on opposite sides of the axis thereof, a plurality of rotatable twister heads on said frame coöperating therewith and provided with wire openings extending therethrough parallel with and on opposite sides of the axis thereof, and means for rotating said heads in unison with each other and alternately in opposite directions, substantially as described.

11. In a fence machine, a frame, a reciprocating carriage on said frame, a plurality of rotatable twister heads on said carriage, a plurality of rotatable heads on said frame coöperating therewith, and means for rotating the members of each set of twister heads in unison with each other and alternate sets in opposite directions, substantially as described.

12. In a fence machine, a frame, a reciprocating carriage on said frame, a plurality of rotatable twister heads on said carriage provided with wire openings extending therethrough parallel with and on opposite sides of the axis thereof, a plurality of rotatable twister heads on said frame coöperating therewith and provided with wire openings extending therethrough parallel with and on opposite sides of the axis thereof, and means for rotating the members of each set of twister heads in unison with each other and alternate sets in opposite directions, substantially as described.

13. A fence machine comprising a frame, a reciprocating carriage on said frame, a plurality of rotatable twister heads on said carriage in transverse alinement with each other, a plurality of rotatable twister heads on said frame in transverse alinement with each other, a gear on the periphery of each twister head, a shaft on said carriage adjacent the twister heads thereon, gears on said shaft meshing with the twister head gears, a shaft on the frame adjacent the twister heads thereon, gears on said last-mentioned shaft meshing with the adjacent twister-head gears, and means for rotating said shafts in unison with each other, substantially as described.

14. A fence machine comprising a frame; a reciprocating carriage on said frame; a plurality of rotatable twister heads on said carriage in transverse alinement with each other; a plurality of rotatable twister heads on said frame in transverse alinement with each other; a gear on the periphery of each twister head, the gears on adjacent twister heads being oppositely disposed; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; and means for rotating said shafts in unison with each other and in opposite directions, substantially as described.

15. A fence machine comprising a frame; a reciprocating carriage on said frame; a plurality of rotatable twister heads on said carriage in transverse alinement with each other, and provided with wire openings extending therethrough parallel with and on opposite sides of the axis thereof; a gear on the periphery of each twister head; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; and means for rotating said shafts in unison with each other, substantially as described.

16. A fence machine comprising a frame; a reciprocating carriage on said frame; a plurality of rotatable twister heads on said carriage in transverse alinement with each other, and provided with wire openings extending therethrough parallel with and on opposite sides of the axis thereof; a gear on the periphery of each twister head, the gears on adjacent twister heads being oppositely disposed; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; and means for rotating said shafts in unison with each other and alternately in opposite directions, substantially as described.

17. A fence machine comprising a frame; a reciprocating carriage on said frame; a plurality of rotatable twister heads on said carriage in transverse alinement with each other; a plurality of rotatable twister heads on said frame in transverse alinement with each other; a gear on the periphery of each twister head; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; a bevel gear on said frame-mounted shaft; a second bevel gear on said frame meshing with said first-mentioned bevel gear; a bevel gear on said carriage-mounted shaft; a bevel gear on said carriage meshing with said last-mentioned bevel gear; a shaft for the bevel gear on said carriage splined in said second bevel gear; and means for driving said second bevel gear, substantially as described.

18. A fence machine comprising a frame; a reciprocating carriage on said frame; a plurality of rotatable twister heads on said carriage in transverse alinement with each other, and provided with wire openings extending therethrough parallel with and on opposite sides of the axis thereof; a gear on the periphery of each twister head; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; a bevel gear on said frame-mounted shaft; a second bevel gear on said frame meshing with said first-mentioned bevel gear; a bevel gear on said carriage-mounted shaft; a bevel gear on said carriage meshing with said last-mentioned bevel gear; a shaft for the bevel gear on said carriage splined in said second bevel gear; and means for driving said second bevel gear, substantially as described.

19. A fence machine comprising a frame; a reciprocating carriage on said frame; a plurality of rotatable twister heads on said carriage in transverse alinement with each other; a plurality of rotatable twister heads on said frame in transverse alinement with each other; a gear on the periphery of each twister head; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; a bevel gear on said frame-mounted shaft; a second bevel gear on said frame meshing with said first-mentioned bevel gear; a bevel gear on said carriage-mounted shaft; a bevel gear on said carriage meshing with said last-mentioned bevel gear; a shaft for the bevel gear on said carriage splined in said second bevel gear; and means for driving said second bevel gear; alternately in opposite directions, substantially as described.

20. A fence machine comprising a frame; a reciprocating carriage on said frame; a plurality of rotatable twister heads on said carriage in transverse alinement with each other, and provided with wire openings extending therethrough parallel with and on opposite sides of the axis thereof; a gear on the periphery of each twister head; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; a bevel gear on said frame-mounted shaft; a second bevel gear on said frame meshing with said first-mentioned bevel gear; a bevel gear on said carriage-mounted shaft; a bevel gear on said carriage meshing with said last-mentioned bevel gear; a shaft for the bevel gear on said carriage splined in said second bevel gear; and means for driving said second bevel gear alternately in opposite directions, substantially as described.

21. A fence machine comprising a frame; a reciprocating carriage on said frame; a plurality of rotatable twister heads on said carriage in transverse alinement with each other; a plurality of rotatable twister heads on said frame in transverse alinement with each other; a gear on the periphery of each twister head; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; a bevel gear on said frame-mounted shaft; a second bevel gear on said frame meshing with said first-mentioned bevel gear; a bevel gear on said carriage-mounted shaft; a bevel gear on said carriage meshing with said last-mentioned bevel gear; a shaft for the bevel gear on said carriage splined in said second bevel gear; a driving shaft; oppositely disposed bevel gears loosely mounted on said driving shaft; a connecting bevel gear meshing with each of the bevel gears on said driving shaft; a clutch splined on the driving shaft between the bevel gears thereon and arranged to engage either; cam-operated mechanism for alternately throwing said clutch member into engagement with the gears on the driving shaft; and a driving connection between one of the bevel gears on said driving shaft and said second-mentioned bevel gear, substantially as described.

22. A fence machine comprising a frame; a reciprocating carriage on said frame; a plurality of rotatable twister heads on said carriage in transverse alinement with each other, and provided with wire openings extending therethrough parallel with and on opposite sides of the axis thereof; a gear on the periphery of each twister head; a shaft on said carriage adjacent the twister heads thereon; gears on said shaft meshing with the twister-head gears; a shaft on the frame adjacent the twister heads thereon; gears on said last-mentioned shaft meshing with the adjacent twister-head gears; a bevel gear on said frame-mounted shaft; a second bevel gear on said frame meshing with said first-mentioned bevel gear; a bevel gear on said carriage-mounted shaft; a bevel gear on said carriage meshing with said last-mentioned bevel gear; a shaft for the bevel gear on said carriage splined in said second bevel gear; a driving shaft; oppositely disposed bevel gears loosely mounted on said driving shaft; a connecting bevel gear meshing with each of the bevel gears on said driving shaft; a clutch splined on the driving shaft between the bevel gears thereon and arranged to engage either; cam-operated mechanism for alternately throwing said clutch member into engagement with the gears on the driving shaft; and a driving connection between one of the bevel gears on said driving shaft and said second-mentioned bevel gears, substantially as described.

23. A reversing mechanism comprising a shaft, two bevel gears loose on said shaft, a bevel gear meshing at opposite sides with said first-mentioned bevel gears, a grooved clutch member splined on said shaft between said first-mentioned bevel gears, an oscillatory arm carrying a roller running in the groove in said clutch member, and a cam member arranged to oscillate said arm to throw said clutch member into and out of engagement with said first-mentioned bevel gears, substantially as described.

24. A reversing mechanism comprising a shaft, two bevel gears loose on said shaft, a bevel gear meshing at opposite sides with said first-mentioned bevel gears, a grooved clutch member splined on said shaft between said first-mentioned beveled gears, an oscillatory arm carrying a roller running in the groove in said clutch member, a constantly rotating cam wheel having cam projections on its periphery, radially extending arms on a side of said cam wheel provided with lateral cam projections coöperating with the cam projections on the periphery of said wheel, an oscillatory arm carrying a roller in operative relation with said cam projections, and an operative connection between said oscillatory arms, substantially as described.

25. A cam mechanism comprising a cam wheel having cam projections on the periphery thereof, radially extending cam arms on a side of said wheel and provided with lateral cam projections coöperating with the cam projections on the periphery of said wheel, a cam roller in operative relation with said cam projections, and means for utilizing motions of said cam roller, substantially as described.

26. In a fence machine, a rotatable twister head having wire openings extending therethrough, and a removable plate on one end of said head provided with an opening forming a twisting recess, substantially as described.

27. In a fence machine, a rotatable twister head having wire openings extending therethrough parallel with and on opposite sides of the axis thereof, and a removable plate on one end of said head provided with an opening forming a twisting recess, substantially as described.

28. In a fence machine, a reciprocating rotatable twister head provided with wire openings extending therethrough parallel with and on opposite sides of the axis thereof and a twisting recess in its outer face; a rotatable twister head distanced therefrom coöperating therewith and provided with wire openings extending therethrough parallel with and on opposite sides of the axis thereof; and means for rotating said heads in unison with each other, substantially as described.

29. In a fence machine, a reciprocating rotatable twister head provided with wire openings extending therethrough parallel with and on opposite sides of the axis thereof and a twisting recess in its outer face; a rotatable twister head distanced therefrom coöperating therewith and provided with wire openings extending therethrough parallel with and on opposite sides of the axis thereof; and means for rotating said heads in unison with each other and alternately in opposite directions, substantially as described.

30. In a fence machine, a frame, a reciprocating carriage on said frame, a plurality of rotatable twister heads on said carriage provided with wire openings extending therethrough parallel with and on opposite sides of the axis thereof and twisting recesses in their outer faces, a plurality of rotatable twister heads on said frame coöperating therewith and provided with wire openings extending therethrough parallel with and on opposite sides of the axis thereof, and means for rotating said heads in unison with each other, substantially as described.

31. In a fence machine, a frame, a reciprocating carriage on said frame, a plurality of rotatable twister heads on said carriage provided with wire openings extending therethrough parallel with and on opposite sides of the axis thereof and twisting recesses in their outer faces, a plurality of rotatable twister heads on said frame coöperating therewith and provided with wire openings extending therethrough parallel with and on opposite sides of the axis thereof, and means for rotating said heads in unison with each other and alternately in opposite directions, substantially as described.

32. In a fence machine, a reciprocating rotatable twister head provided with wire openings extending therethrough parallel with and on opposite sides of the axis thereof, a removable plate on an end of said head provided with an opening forming a twisting recess, a rotatable twister head distanced from said first-mentioned head and coöperating therewith and provided with wire openings extending therethrough parallel with and on opposite sides of the axis thereof, and means for rotating said heads in unison with each other, substantially as described.

33. In a fence machine, a reciprocating rotatable twister head provided with wire openings extending therethrough parallel with and on opposite sides of the axis thereof, a removable plate on an end of said head provided with an opening forming a twisting recess, a rotatable twister head distanced from said first-mentioned head and coöperating therewith and provided with wire openings extending therethrough parallel with and on opposite sides of the axis thereof, and means for rotating said heads in unison with each other and alternately in opposite directions, substantially as described.

34. In a fence machine, a frame, a reciprocating carriage on said frame, a plurality of rotatable twister heads on said carriage provided with wire openings extending therethrough parallel with and on opposite sides of the axis thereof, a removable plate on an end of each of said twister heads provided with an opening forming a twisting recess, a plurality of rotatable twister heads on said frame coöperating with said first-mentioned twister heads and provided with wire openings extending therethrough parallel with and on opposite sides of the axis thereof, and means for rotating said heads in unison with each other, substantially as described.

35. In a fence machine, a frame, a reciprocating carriage on said frame, a plurality of rotatable twister heads on said carriage provided with wire openings extending therethrough parallel with and on opposite sides of the axis thereof, a removable plate on an end of each of said twister heads provided with an opening forming a twisting recess, a plurality of rotatable twister heads on said frame coöperating with said first-mentioned twister heads and provided with wire openings extending therethrough parallel with and on opposite sides of the axis thereof, and means for rotating said heads in unison with each other and alternately in opposite directions, substantially as described.

36. In a fence machine, means for feeding wires therethrough in pairs, means for twisting said wires to secure pickets therein, means for doubling certain of said pickets centrally, a removable curved guide adapted to guide the ends of said doubled pickets between said wires, and means for again twisting said wires to secure said doubled ends, substantially as described.

37. In a fence machine, means for feeding wires therethrough in pairs, means for twisting said wires to secure pickets therein, means for doubling certain of said pickets centrally, a depressible curved guide adapted to guide the ends of said doubled pickets between said wires, and means for again twisting said wires to secure said doubled ends, substantially as described.

38. In a fence machine, means for feeding wires therethrough in pairs, means for twisting said wires to secure pickets therein, means for doubling certain of said pickets centrally, a curved guide adapted to guide the ends of said doubled pickets between said wires, there being slots in said guide to permit the passage of said wires, and means for again twisting said wires to secure said doubled ends, substantially as described.

39. In a fence machine, means for feeding wires therethrough in pairs, means for twisting said wires to secure pickets therein, means for doubling certain of said pickets centrally, a removable curved guide adapted to guide the ends of said doubled pickets between said wires, there being slots in said guide to permit the passage of said wires; and means for again twisting said wires to secure said doubled ends, substantially as described.

40. In a fence machine, means for feeding wires therethrough in pairs; means for twisting said wires to secure pickets therein; means for doubling certain of said pickets centrally; a depressible curved guide adapted to guide the ends of said doubled pickets between said wires, there being slots in said guide to permit the passage of said wires; and means for again twisting said wires to secure said doubled ends, substantially as described.

41. In a fence machine, means for feeding wires therethrough in pairs, means for twisting said wires to secure pickets therein, means for doubling certain of said pickets centrally, an oscillatory arm in said machine, a curved channel guide member on the swinging end of said arm, there being slots in said guide member to permit the passage of said wires, a cam arranged to oscillate said arm to bring said guide member into and out of operative position to guide the ends of said doubled ends between said wires, and means for again twisting said wires to secure said doubled ends, substantially as described.

42. As a means for positioning sinuously formed objects, a support therefor, and a finger arranged to engage a sinuosity of said object and force it into a certain position, substantially as described.

43. As a means for positioning sinuously formed objects, a support therefor, and a pair of fingers arranged to engage sinuosities of said objects and force them into a certain position, substantially as described.

44. As a means for positioning sinuously formed objects, a support therefor, a finger arranged to engage a sinuosity of said object and force it into a certain position, and means for shifting said finger to engage another sinuosity, substantially as described.

45. As a means for positioning sinuously formed objects, a support therefor, a pair of fingers arranged to engage sinuosities of said objects and force them into a certain position, and means for shifting said fingers to engage other sinuosities, substantially as described.

46. As a means for positioning sinuously formed objects, a support therefor, and a reciprocating finger having a beveled nose arranged to engage a sinuosity of said object and force it into a certain position, substantially as described.

47. As a means for positioning sinuously formed objects, a support therefor, and a pair of reciprocating fingers having beveled noses arranged to engage sinuosities of said objects and force them into a certain position, substantially as described.

48. As a means for positioning sinuously formed objects, a support therefor, a reciprocating finger having a beveled nose arranged to engage a sinuosity of said object and force it into a certain position, and means for shifting said finger to engage another sinuosity, substantially as described.

49. As a means for positioning sinuously formed objects, a support therefor, a pair of reciprocating fingers having beveled noses arranged to engage sinuosities of said objects and force them into a certain position, and means for shifting said fingers to engage other sinuosities, substantially as described.

50. In a fence machine, a reciprocating carriage, a picket support, and a finger on said carriage adapted to engage a sinuosity of a sinuously formed picket in said support and position the same in said support, substantially as described.

51. In a fence machine, a reciprocating carriage, a picket support, and a pair of fingers on said carriage adapted to engage sinuosities of a sinuously formed picket in said support and position the same in said support, substantially as described.

52. In a fence machine, a reciprocating carriage, a picket support, a finger on said carriage adapted to engage a sinuosity of a sinuously formed picket in said support and position the same in said support, and means for shifting said finger laterally on said carriage to engage a different sinuosity, substantially as described.

53. In a fence machine, a reciprocating carriage, a picket support, a pair of fingers on said carriage adapted to engage sinuosities of a sinuously formed picket in said support and position the same in said support, and means for shifting said fingers laterally on said carriage to engage different sinuosities, substantially as described.

54. In a fence machine, a reciprocating carriage, a picket support, and a finger having a beveled nose on said carriage adapted to engage a sinuosity of a sinuously formed picket in said support and position the same in said support, substantially as described.

55. In a fence machine, a reciprocating carriage, a picket support, and a pair of fingers having beveled noses on said carriage adapted to engage sinuosities of a sinuously formed picket in said support and position the same in said support, substantially as described.

56. In a fence machine, a reciprocating carriage, a picket support, a finger having a beveled nose on said carriage adapted to engage a sinuosity of a sinuously formed picket in said support and position the same in said support, and means for shifting said finger laterally on said carriage to engage a different sinuosity, substantially as described.

57. In a fence machine, a reciprocating carriage, a picket support, a pair of fingers having beveled noses on said carriage adapted to engage sinuosities of a sinuously formed picket in said support and position the same in said support, and means for shifting said fingers laterally on said carriage to engage different sinuosities, substantially as described.

58. In a fence machine, a reciprocating carriage, a picket support, a finger on said carriage adapted to engage a sinuosity of a sinuously formed picket in said support and position the same in said support, a laterally slidable bar on said carriage, a cam roller on said bar, there being a stationary cam groove coöperating with said roller, said cam groove being of shallow V-form, and a pawl and ratchet connection between said bar and said finger for shifting said finger laterally on said carriage to engage a different sinuosity, substantially as described.

59. In a fence machine, a reciprocating carriage; a picket support; a pair of fingers on said carriage adapted to engage sinuosities of a sinuously formed picket in said support and position the same in said support; a laterally slidable bar on said carriage; a cam roller on said bar, there being a stationary cam groove coöperating with said roller, said cam groove being of shallow V-form; and a pawl and ratchet connection between said bar and said fingers for shifting said fingers laterally on said carriage to engage different sinuosities, substantially as described.

60. In a fence machine, a frame, means for feeding wires therethrough in pairs, means for twisting said wires to secure pickets therein, automatic bending means arranged to bend the ends of certain of said pickets into engagement with certain of said wires, and automatic bending means arranged to bend certain others of said pickets centrally into engagement with certain of said wires, substantially as described.

61. In a fence machine, a frame, means for feeding wires therethrough in pairs, means for twisting said wires to secure pickets therein, automatic bending means arranged below said wires and elevatable to bend the ends of certain of said pickets into engagement with certain of said wires, and automatic bending means arranged above said wires and depressible to bend certain others of said pickets centrally into engagement with certain of said wires, substantially as described.

62. In a fence machine, a frame, means for feeding wires therethrough in pairs, means for twisting said wires to secure pickets therein, a bending head arranged at one side of said frame below said wires and grooved to receive wires and pickets, means for elevating said bending head into engagement with wires and pickets, a revoluble bending finger coöperating with said head, a bending head arranged centrally above said wires and grooved to receive wires and pickets, means for depressing said last-mentioned bending head into engagement with wires and pickets, and a revoluble bending finger coöperating with said last-mentioned bending head, substantially as described.

63. In a fence machine, a frame, means for feeding wires therethrough in pairs, means for twisting said wires to secure pickets therein, a bending head arranged at one side of said frame below said wires and grooved to receive wires and pickets, means for elevating said bending head into engagement with wires and pickets, a revoluble bending finger coöperating with said head, a bending head arranged centrally above said wires and grooved to receive wires and pickets, means for depressing said last-mentioned bending head into engagement with wires and pickets, a revoluble bending finger coöperating with said last-mentioned bending head, and means for holding the bent portions of pickets in bent relation pending twisting of said wires, substantially as described.

64. In a fence machine, a frame, means for feeding wires therethrough in pairs, means for twisting said wires to secure pickets therein, a bending head arranged adjacent said wires and grooved to receive wires and pickets, means for moving said bending head into and out of engagement with wires and pickets, and a revoluble picket-bending finger coöperating with said head, substantially as described.

65. In a fence machine, a frame, means for feeding wires therethrough in pairs, means for twisting said wires to secure pickets therein, a bending head arranged adjacent said wires and grooved to receive wires and pickets, means for moving said bending head into and out of engagement with wires and pickets, a revoluble picket-bending finger coöperating with said head, and means for holding the bent portions of pickets in bent relation pending twisting of said wires, substantially as described.

66. In a fence machine, a frame, means for feeding wires therethrough in pairs, means for twisting said wires to secure pickets therein, a bending head arranged adjacent said wires and grooved to receive wires and pickets, means for moving said bending head into and out of engagement with wires and pickets, a revoluble picket-bending finger coöperating with said head, and an automatically operating catch arranged to engage the bent portions of pickets and hold them in bent relation pending twisting of said wires, substantially as described.

67. In a fence machine, a frame, means for feeding wires therethrough in pairs, means for twisting said wires to secure pickets therein, a laterally positioned bending head arranged under said wires and grooved to receive wires and pickets, means for elevating and depressing said bending head into and out of engagement with wires and pickets, and a revoluble picket-bending finger coöperating with said head, substantially as described.

68. In a fence machine, a frame, means for feeding wires therethrough in pairs, means for twisting said wires to secure pickets therein, a centrally positioned bending head arranged above said wires and grooved to receive wires and pickets, means for depressing and elevating said bending head into and out of engagement with wires and pickets, and a revoluble bending finger cooperating with said head, substantially as described.

69. A feed mechanism for a wire fence machine, comprising sprockets adapted to engage pickets of a fence, and means for holding pickets against springing over the sprocket teeth, substantially as described.

70. A feed mechanism for a wire fence machine, comprising sprockets adapted to engage pickets of a fence, an oscillating shaft adjacent said sprockets, and arms on said shaft arranged to prevent pickets from springing over the sprocket teeth, substantially as described.

71. A feed mechanism for a wire fence machine, comprising sprockets adapted to engage pickets of a fence, an oscillating shaft adjacent said sprockets, arms on said shaft adapted to rest upon cables of a fence, and arms on said shaft adapted to engage against the rearward sides of pickets of a fence, substantially as described.

72. A feed mechanism for a wire fence machine, comprising grooved wheels adapted to receive the cables of a wire fence, radially extending teeth on the sides of said wheels adapted to engage the pickets of a fence, and means for holding pickets from springing over said teeth, substantially as described.

73. A feed mechanism for a wire fence machine, comprising grooved wheels adapted to receive the cables of a wire fence, radially extending teeth on the sides of said wheels adapted to engage the pickets of a fence, an oscillating shaft adjacent said sprockets, and arms on said shaft arranged to prevent pickets from springing over the sprocket teeth, substantially as described.

74. A feed mechanism for a wire fence machine, comprising grooved wheels adapted to receive the cables of a wire fence, radially extending teeth on the sides of said wheels adapted to engage the pickets of a fence, an oscillating shaft adjacent said sprockets, arms on said shaft adapted to rest on cables of a fence, and arms on said shaft adapted to engage against the rearward sides of pickets of a fence, substantially as described.

75. In a fence machine, a frame; a reciprocating carriage on said frame; a plurality of rotatable twister heads on said carriage; a pair of cable wires passed through each of said twister heads; means for feeding said wires through said machine; a plurality of rotatable heads on said frame coöperating therewith; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

76. In a fence machine, a frame, a reciprocating carriage on said frame; a plurality of rotatable twister heads on said carriage and provided with wire openings extending therethrough parallel with and on opposite sides of the axis thereof; a pair of cable wires passed through each of said twister heads; means for feeding said wires through said machine; a plurality of rotatable twister heads on said frame coöperating with said first-mentioned twister heads and provided with wire openings extending therethrough parallel with and on opposite sides of the axis thereof; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

77. In a fence machine, a frame; a reciprocating carriage on said frame; a plurality of rotatable twister heads on said carriage and provided with wire openings extending therethrough parallel with and on opposite sides of the axis thereof, there being a twisting recess in the outer face of each of said heads; a pair of cable wires passed through each of said twister heads; means for feeding said wires through said machine; a plurality of rotatable twister heads on said frame coöperating with said first-mentioned twister heads and provided with wire openings extending therethrough parallel with and on opposite sides of the axis thereof; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence;

and means for rotating the drum to wind the fence thereon substantially as described.

78. In a fence machine, a frame; a reciprocating carriage on said frame; a plurality of rotatable twister heads on said carriage and provided with wire openings extending therethrough parallel with and on opposite sides of the axis thereof; a removable plate on each of said heads having a central opening therein to form a twisting recess in the outer face of each of said heads; a pair of cable wires passed through each of said twister heads; means for feeding said wires through said machine; a plurality of rotatable heads on said frame coöperating therewith; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

79. In a fence machine, a frame; a reciprocating carriage on said frame; a plurality of rotatable twister heads on said carriage; a pair of cable wires passed through each of said twister heads; sprocket wheels adapted to engage pickets secured in the fence; means for holding pickets against springing over the sprocket teeth; a plurality of rotatable twister heads on said frame coöperating with said first-mentioned twister heads; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

80. In a fence machine, a frame; a reciprocating carriage on said frame; a plurality of rotatable twister heads on said carriage; a pair of cable wires passed through each of said twister heads; sprocket wheels adapted to engage pickets secured in the fence; an oscillatory shaft adjacent said sprockets; arms on said shaft adapted to prevent pickets from springing over the sprocket teeth; a plurality of rotatable twister heads on said frame coöperating with said first-mentioned twister heads; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

81. In a fence machine, a frame; a reciprocating carriage on said frame; a plurality of rotatable twister heads on said carriage; a pair of cable wires passed through each of said twister heads; sprocket wheels adapted to engage pickets secured in the fence; an oscillating shaft adjacent said sprockets; arms on said shaft adapted to rest upon cables of a fence; arms on said shaft adapted to engage against the rearward sides of pickets of a fence; a plurality of rotatable twister heads on said frame coöperating with said first-mentioned twister heads; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

82. In a fence machine, a frame; a reciprocating carriage on said frame; a plurality of rotatable twister heads on said carriage; a pair of cable wires passed through each of said twister heads; grooved wheels adapted to receive the cables of a wire fence; radially extending teeth on the sides of said wheels adapted to engage the pickets of a fence; an oscillating shaft adjacent said sprockets; arms on said shaft adapted to rest upon cables of a fence; arms on said shaft adapted to engage against the rearward sides of pickets of a fence; means for operating said grooved wheels and oscillating shaft together to feed the fence through the machine; a plurality of rotatable twister heads on said frame coöperating with said first-mentioned twister heads; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

83. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating therewith, and provided with wire openings extending therethrough parallel with and on opposite sides of the axis thereof; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

84. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating said heads in unison with each other and alternately in opposite directions to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

85. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating the members of each set of twister heads in unison with each other and alternately in opposite directions to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

86. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating the members of each set of twister heads in unison with each other and alternately in opposite directions and alternate sets of heads in opposite directions; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

87. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating said heads in unison with each other to secure pickets therein; a bending head arranged centrally above said wires and grooved to receive wires and pickets; means for depressing said bending head into engagement with said wires and pickets; a revoluble bending finger coöperating with said head; a guide coöperating with said finger to guide picket ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

88. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating said heads in unison with each other to secure pickets therein; a bending head arranged centrally above said wires and grooved to receive wires and pickets; means for depressing said bending head into engagement with wires and pickets; a revoluble bending finger coöperating with said bending head; a guide coöperating with said finger to guide picket ends between certain of said wires; means for holding the bent portions of pickets in bent relation pending the twisting of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and means for rotating the drum to wind the fence thereon, substantially as described.

89. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage bends of a sinuously bent picket in the fence and position the same therein; means for shifting said fingers to engage other bends; means for bending the ends of certain of said pickets into engagement with certain of said wires; a drum to receive the fence; and means for rotating the drum to wind the fence thereon, substantially as described.

90. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage bends of a sinuously bent picket in the fence and position the same therein; means for shifting said fingers laterally on said carriage to engage different bends; means for bending the ends of certain of said pickets into engagement with certain of said wires; a drum to receive the fence; and means for rotating the drum to wind the fence thereon, substantially as described.

91. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating said heads in unison with each other to secure pickets therein; means for doubling certain of said pickets centrally and inserting their doubled ends between certain of said wires; a holder for pickets coöperating with the twister heads on said carriage; fingers having beveled noses on said carriage adapted to engage bends of a sinuously bent picket in the fence and position the same therein; means for shifting said fingers to engage other bends; means for bending the ends of certain of said pickets into engagement with certain of said wires; a drum to receive the fence; and means for rotating the drum to wind the fence thereon, substantially as described.

92. In a fence machine, a frame; a reciprocating carriage on said frame; a plurality of rotatable twister heads on said carriage; a pair of cable wires passed through each of said twister heads; means for feeding said wires through said machine; a plurality of rotatable twister heads on said frame coöperating with said first-mentioned twister heads; means for periodically rotating said heads in unison with each other to secure pickets therein; means for doubling certain of said pickets centrally and inserting their doubled ends between certain of said wires; a holder for pickets coöperating with the twister heads on said carriage; fingers having beveled noses on said carriage adapted to engage bends of sinuously bent pickets in the fence and position the same therein; a laterally slidable bar on said carriage; a cam roller on said bar, there being a stationary cam groove coöperating with said roller, said cam groove being of shallow V-form; a pawl and ratchet connection between said bar and said fingers arranged to shift said fingers to engage different bends; means for bending the ends of certain of said pickets into engagement with certain of said wires; a drum to receive the fence; and means for rotating the drum to wind the fence thereon, substantially as described.

93. In a fence machine, a frame; a reciprocating carriage on said frame; a plurality of rotatable twister heads on said carriage; a pair of cable wires passed through each of said twister heads; means for feeding said wires through said machine; a plurality of rotatable heads on said frame coöperating therewith; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; a bending head arranged at one side of said frame below said wires and grooved to receive wires and pickets; means for elevating said head into engagement with wires and pickets; a revoluble bending finger coöperating with said head; a drum to receive the fence; and means for rotating the drum to wind the fence thereon, substantially as described.

94. In a fence machine, a frame; a reciprocating carriage on said frame; a plurality of rotatable twister heads on said carriage; a pair of cable wires passed through each of said twister heads; means for feeding said wires through said machine; a plurality of rotatable heads on said frame coöperating therewith; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; a bending head arranged at one side of said frame below said wires and grooved to receive wires and pickets; means for elevating said head into engagement with wires and pickets; a finger on the carriage arranged to engage and hold a bent picket end; a drum to receive the fence; and means for rotating the drum to wind the fence thereon, substantially as described.

95. In a fence machine, a frame; a reciprocating carriage on said frame; a plurality of rotatable twister heads on said carriage; a pair of cable wires passed through each of said twister heads; means for feeding said wires through said machine; a plurality of rotatable heads on said frame coöperating therewith; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a removable collapsible drum to receive the fence; and means for rotating the drum to wind the fence thereon, substantially as described.

96. In a fence machine, a frame; a reciprocating carriage on said frame; a plurality of rotatable twister heads on said carriage; a pair of cable wires passed through each of said twister heads; means for feeding said wires through said machine; a plurality of rotatable heads on said frame coöperating therewith; means for periodically rotating said heads in unison with each other to secure pickets therein; means for doubling certain of said pickets centrally and inserting their doubled ends between certain of said wires; a holder for pickets coöperating with the twister heads on said carriage; fingers on said carriage adapted to engage certain of sinuous bends in pickets in the fence; means for shifting said fingers to engage other bends; means for bending the ends of certain of said pickets into engagement with certain of said wires; a drum to receive the fence; and frictional means for rotating the drum to wind the fence thereon, substantially as described.

97. In a fence machine, a frame; a reciprocating carriage on said frame; a plurality of rotatable twister heads on said carriage and provided with wire openings extending therethrough parallel with and on opposite sides of the axis thereof; a removable plate on each of said heads having a central opening therein to form a twisting recess in the outer face of each of said heads; a pair of cable wires passed through each of said twister heads; grooved wheels adapted to receive the cables of a wire fence; radially extending teeth on the sides of said wheels adapted to engage the pickets of a fence; an oscillating shaft adjacent said sprockets; arms on said shaft adapted to rest upon cables of a fence; arms on said shaft adapted to engage against the rearward sides of pickets of a fence; a plurality of rotatable twister heads on said frame coöperating with said first-mentioned twister heads and provided with wire openings extending therethrough parallel with and on opposite sides of the axis thereof; means for periodically rotating the members of each set of twister heads in unison with each other alternately in opposite directions and alternate sets of heads in opposite directions; a bending head arranged centrally above said wires and grooved to receive wires and pickets; means for depressing said bending head into engagement with wires and pickets; a revoluble bending finger coöperating with said head; a guide coöperating with said finger to guide picket ends between certain of said wires; means for holding the bent portions of pickets in bent relation pending twisting of said wires; a holder for pickets coöperating with the twister heads on said carriage; fingers having beveled noses on said carriage adapted to engage bends of sinuously bent pickets in the fence and position the same therein; a laterally slidable bar on said carriage; a cam roller on said bar, there being a stationary cam groove coöperating with said roller, said cam groove being of shallow V-form; a pawl-and-ratchet connection between said bar and said fingers arranged to shift said fingers to engage different bends; a bending head arranged at one side of said frame below said wires and grooved to receive wires and pickets; means for elevating said head into engagement with wires and pickets; a revoluble bending finger coöperating with said last-mentioned head; a finger on the carriage arranged to engage and hold a bent picket end; a removable collapsible drum to receive the fence; and frictional means for rotating the drum to wind the fence thereon, substantially as described.

JOSEPH H. TAUSCH.

Witnesses:
    CHAS. C. TILLMAN,
    A. E. OLSON.